(12) United States Patent
Clark et al.

(10) Patent No.: US 8,386,615 B2
(45) Date of Patent: Feb. 26, 2013

(54) METHOD, SYSTEM AND APPARATUS FOR CAUSING A COMMUNICATION DEVICE TO JOIN A COMMUNICATION SESSION

(75) Inventors: David William Clark, Carp (CA); Eric John Wolf, Stittsville (CA); Jeffrey William Dawson, Stittsville (CA); Jonathan Allan Arsenault, Orleans (CA)

(73) Assignee: BCE Inc., Verdun, Quebec (CA)

( * ) Notice: Subject to any disclaimer, the term of this patent is extended or adjusted under 35 U.S.C. 154(b) by 923 days.

(21) Appl. No.: 12/520,079

(22) PCT Filed: Dec. 19, 2006

(86) PCT No.: PCT/CA2006/002071
§ 371 (c)(1),
(2), (4) Date: Jun. 18, 2009

(87) PCT Pub. No.: WO2008/074117
PCT Pub. Date: Jun. 26, 2008

(65) Prior Publication Data
US 2010/0011108 A1   Jan. 14, 2010

(51) Int. Cl.
*G06F 15/16* (2006.01)
*G06F 12/00* (2006.01)

(52) U.S. Cl. ............................................. 709/227

(58) Field of Classification Search .......... 709/217–218, 709/227–229, 250
See application file for complete search history.

(56) References Cited

U.S. PATENT DOCUMENTS

| | | | |
|---|---|---|---|
| 4,640,987 A | 2/1987 | Tsukada et al. | |
| 6,052,578 A * | 4/2000 | McWeeny et al. | 455/414.1 |
| 7,106,848 B1 | 9/2006 | Barlow et al. | |
| 7,120,139 B1 | 10/2006 | Kung et al. | |
| 7,516,410 B2 * | 4/2009 | Thompson et al. | 715/753 |
| 7,826,832 B1 * | 11/2010 | Ananthakrishnan | 455/417 |
| 2003/0058806 A1 | 3/2003 | Meyerson et al. | |
| 2003/0231639 A1 | 12/2003 | Mikkola | |
| 2005/0047389 A1 | 3/2005 | Bond et al. | |
| 2005/0048994 A1 | 3/2005 | Benco et al. | |
| 2005/0135333 A1 | 6/2005 | Rojas | |
| 2005/0170819 A1 * | 8/2005 | Barclay et al. | 455/416 |
| 2005/0198164 A1 | 9/2005 | Moore et al. | |
| 2006/0070003 A1 | 3/2006 | Thompson et al. | |
| 2008/0021949 A1 * | 1/2008 | John et al. | 709/200 |
| 2008/0065527 A1 * | 3/2008 | Chieu et al. | 705/37 |

FOREIGN PATENT DOCUMENTS
EP    1 558 004 A1    7/2005

OTHER PUBLICATIONS

International Search Report mailed on Oct. 11, 2007 in connection with International Patent Application No. PCT/CA2006/002073.
International Search Report mailed on Sep. 19, 2007 in connection with corresponding International Patent Application No. PCT/CA2006/002071.

(Continued)

Primary Examiner — Zarni Maung

(57) ABSTRACT

According to embodiments of the present invention, there are provided a method, system and apparatus for joining a communication session. A method comprises receiving from a first communication device an indication of a desire of the first communication device to establish a communication session; the first communication device having been associated with a device group comprising the first communication device and at least one second communication device. The method further comprises determining if there exists an active communication session with the at least one second communication device. The method further comprises, responsive to existence of the active communication session, causing the first communication device to join the active communication session.

50 Claims, 10 Drawing Sheets

OTHER PUBLICATIONS

Written Opinion of the International Searching Authority mailed on Sep. 19, 2007 in connection with corresponding International Patent Application No. PCT/CA2006/002071.

International Preliminary Report on Patentability completed on Jan. 30, 2009 in connection with corresponding International Patent Application No. PCT/CA2006/002071.

Panasonic, KX-TG5776S—Expandable Systems—Shop and Compare at Panasonic, downloaded on Oct. 23, 2007, 3 pages.

Nortel Networks, "Succession VoIP VPN Feature Guide—SN06.1", Copyright 2004, 48 pages.

Office Action issued by the Canadian Intellectual Property Office on Nov. 18, 2011 in connection with Canadian Patent Application Serial No. 2,612,924, 2 pages.

\* cited by examiner

METHOD, SYSTEM AND APPARATUS FOR CAUSING A COMMUNICATION DEVICE TO JOIN A COMMUNICATION SESSION

FIELD OF THE INVENTION

This invention relates to the field of telecommunications in general and, more specifically, to a method, system and apparatus for causing a communication device to join a communication session.

BACKGROUND OF THE INVENTION

In most developed countries of the world, customers have access to a myriad of communication devices for satisfying their communication needs. These communication devices include office telephones, home telephones, wireless communication devices, desktops, laptops, set-top boxes, gaming devices, etc. Each of these communication devices usually serves a somewhat distinct need. For example, the office telephone is likely to be primarily used for effecting business-related communications during business hours. The home telephone, on the other hand, is more likely to be used by the customer for effecting personal communications when at home. A wireless communication device is more likely to be used for effecting communications while on the go. Each of these communication devices has different costs associated with using them for effecting communications. For example, effecting communications using the wireless communication device is likely to incur a somewhat higher per-minute-cost than, for example, using the home telephone. Accordingly, when the customer wishes to place a telephone call while at home, the customer is more likely to wish to do so using the home telephone in order, for example, to control costs. On the other hand, when the customer is in his vehicle on the way home, the customer is likely to use the wireless communication device to place and receive calls, despite the higher costs.

Occasionally a user of a communication device who is engaged in a conversation may wish to continue the conversation on a different communications device. For example, the user may have started a conversation on her wireless communication device while driving towards her home. When the user gets home, she may prefer to continue the conversation on her home telephone in order, for example, to better manage costs associated with the conversation or not to have to worry about the wireless communication device's battery or wireless coverage.

Of course, the user may choose to hang up her wireless communication device and to re-establish the call using her home telephone. That, however, interrupts the conversation that is in progress. Furthermore, re-dialling the connection is inconvenient, especially if the user has to look up a telephone number. Additionally, the user runs the risk of the person on the other end being diverted to another call or activity while that user redials the connection.

There is therefore a need for a method for causing a communication device to join a communication session that is in-progress, without disrupting the communication and without having to re-dial and re-establishing the connection.

SUMMARY OF THE INVENTION

According to a first broad aspect of the present invention, there is provided a method. The method comprises receiving from a first communication device an indication of a desire of the first communication device to establish a communication session; the first communication device being associated with a device group comprising the first communication device and at least one second communication device. The method further comprises determining if there exists an active communication session with at least one of the at least one second communication device and, responsive to existence of the active communication session, causing the first communication device to join the active communication session.

According to a second broad aspect of the present invention, there is provided an apparatus. The apparatus comprises means for receiving from a first communication device an indication of a desire of the first communication device to establish a communication session; the first communication device being associated with a device group comprising the first communication device and at least one second communication device and means for determining if there exists an active communication session with at least one of the at least one second communication device. The apparatus further comprises means causing the first communication device to join the active communication session, the means for causing being responsive to at least a positive determination that there exists an active communication session with the at least one second communication device.

According to a third broad aspect of the present invention, there is provided a system. The system comprises an application server being operable to receive from a first communication device an indication of a desire of the first communication device to establish a communication session; the first communication device being associated with a device group comprising the first communication device and at least one second communication device. The application server is further operable to determine if there exists an active communication session with at least one of the at least one second communication device and, responsive to existence of the active communication session, to cause the first communication device to join the active communication session.

According to a fourth broad aspect of the present invention, there is provided a communication device. The communication device is registerable in association with a device group. The communication device comprises a first functional entity for connecting to a communication network adapted for handling voice communications; a second functional entity for receiving spoken utterances from a user to be conveyed via the first interface and for conveying to the user audio messages received via the first interface to the user; and a third functional entity for allowing the user to selectively convey a desire to establish a new communication session or a desire to join an active communication session that is in progress with another communication device registered in the device group.

According to another broad aspect of the present invention, there is provided a computer-readable medium comprising computer-readable program code which, when executed by a computing apparatus, causes the computing apparatus:

to receive from a first communication device an indication of a desire of the first communication device to establish a communication session; the first communication device being associated with a device group comprising the first communication device and at least one second communication device;

to determine if there exists an active communication session with at least one of the at least one second communication device; and responsive to existence of the active communication session, to cause the first communication device to join the active communication session.

According to yet another broad aspect of the present invention, there is provided a method. The method comprises (i)

engaging a communication device that is associated with a device group; (i) being presented with an option for either effecting an origination of a new communication session or effecting joining an active communication session that is in progress with another communication device registered in the device group; (iii) taking an action to either establish the new communication session or to join the active communication session.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
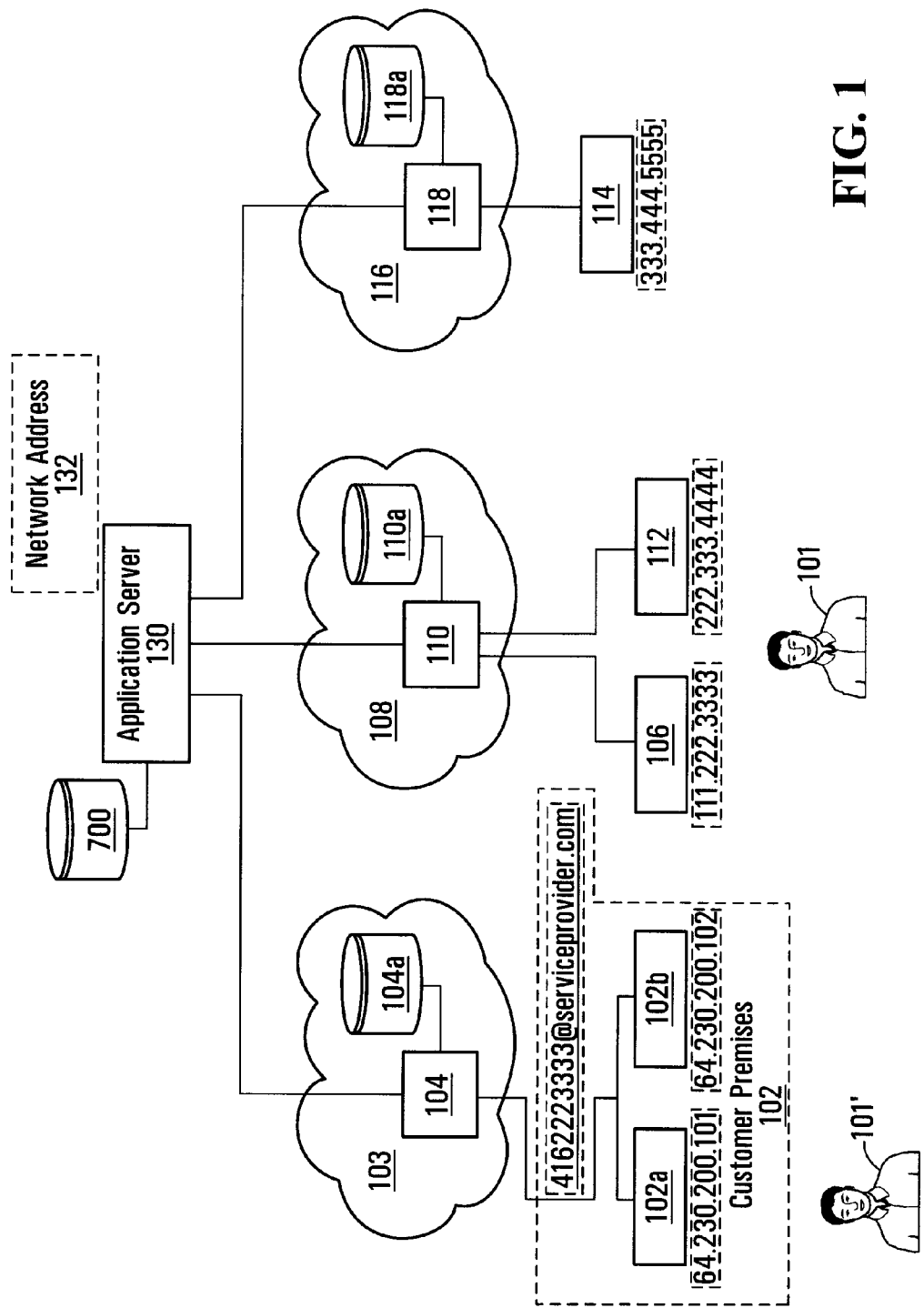
FIG. 1 is a diagram representing various components of a non-limiting embodiment of an infrastructure for causing a communication device to join a communication session.

FIG. 1 shows various components of an infrastructure for causing a communication device to join an active communication session. A user 101 may have access to several communication devices or, in other words, the user 101 may be associated with one or more communication devices. For example, the user 101 may be associated with a communication device 102a and a communication device 102b located at a customer premises 102. The customer premises 102 can, for example, comprise a house, a unit in a multi-dwelling (MDU) unit and the like. For the purposes of establishing and terminating communication sessions, the communication devices 102a and 102b may be coupled to a communication network 103. Even though the nature of the communication devices 102a, 102b and the communication network 103 is interdependent, it is not particularly limited. In a first non-limiting embodiment of the present invention, the communication network 103 may comprise a Public Switched Telecommunication Network (PSTN). Within these embodiments, the communication devices 102a and 102b may comprise Plain Old Telephone Service (POTS) phones, whether wired or cordless.

In a second non-limiting embodiment of the present invention, the communication network 103 may comprise a data network adapted for handling VoIP calls, such as, a public data network (ex. the Internet) or a private data network (ex. a LAN). Within these non-limiting embodiments of the present invention, the communication devices 102a, 102b can be implemented in hardware, software, firmware or a combination thereof. In a specific non-limiting example, the communication device 102a may comprise a VoIP phone and the communication device 102b may comprise a computing apparatus executing a soft client for handling VoIP calls. It should be understood that the customer premises 102 may comprise one or more additional communication devices that may include, but are not limited to, one or more other VoIP phones, one or more wireless VoIP phones (such as, for example, a J2ME wireless phone), one or more Plain Old Telephone System (POTS) phones equipped with an Analog Terminal Adapter (ATA), one or more other computing apparatuses executing soft clients, one or more set-top boxes, one or more gaming devices, a security system and the like. It should be noted that some of these additional communication devices may be coupled to the communication network 103. In alternative embodiments of the present invention, which will be described in greater detail with reference to FIG. 9, some or all of these additional communication devices may be coupled to a communication network different from the communication network 103. The number of communication devices installed within the customer premises 102 is not limited other than by business considerations of a service provider who is responsible for delivery of telephony services to the customer premises 102.

In another non-limiting embodiment of the present invention, the communication network 103 may comprise a wireless communication network, such as, for example, a WiMAx or a Wi-Fi based communication network. Persons skilled in the art will appreciate that the communication network 103 may have other configurations as well.

For the purpose of establishing and terminating communication sessions via the communication network 103, each of the communication devices 102a, 102b can be associated with a network identifier, which identifies each of the communication devices 102a, 102b to the communication network 103. In the specific scenario where the communication network 103 is the PSTN, the communication devices 102a, 102b can be associated with a single telephone number. In an alternative non-limiting embodiment, the communication devices 102a, 102b may be each associated with a separate telephone number. This is particularly true in those embodiments, where the user 101 subscribes to more than one telephone number at the customer premises 102.

In the specific scenario being presented herein where the communication network 103 is the data network adapted for handling VoIP calls, the communication devices 102a, 102b may have network identifiers assigned in the following manner. In a first non-limiting scenario, the communication devices 102a, 102b may be associated with a pseudo-telephone number compatible with the data network adapted for handling VoIP calls, which may comprise, for example, a Session Initiation Protocol (SIP) Universal Resource Identifier (URI). To that end, each of the communication devices 102a, 102b may be associated with a separate SIP URI. For example, the communication device 102a may be associated with a SIP URI identity_1@serviceprovider.com and the communication device 102b may be associated with a SIP URI identity_2@serviceprovider.com.

In yet another non-limiting scenario, the communication devices 102a, 102b may be associated with a single SIP URI, but be individually addressable within the single SIP URI. This can be implemented, for example, by assigning each of the communication devices 102a, 102b a unique IP address (or another network identifier). Alternatively, the communication devices 102a, 102b may be uniquely addressable by another identifier, such as for example, port numbers associated with a home gateway (not depicted) responsible for mediating communication between the communication devices 102a, 102b and the communication network 103. In alternative non-limiting embodiments of the present invention, the communication devices 102a, 102b may be uniquely addressable by means of a respective MAC address.

For the purposes of initiating and terminating communication sessions between one or more of the communication devices 102a, 102b and another device coupled to the communication network 103 (or another communication network), via the communication network 103, the communication network 103 may comprise a network element 104. In the specific scenario where the communication network 103 is the PSTN, the network element 104 may comprise a telephony switch. An example network element 104 can be embodied in a DMS100 or a DMS200 telephony switch provided by Nortel Networks Ltd. of 8200 Dixie Road, Brampton, Ontario L6T 5P6, Canada. One skilled in the art will readily appreciate other possible configurations of the network element 104.

In the specific non-limiting scenario where the communication network 103 is the data network adapted for handling VoIP calls, the network element 104 can be embodied in what is sometimes referred to in the industry as a "soft switch" and comprises circuitry, software and/or control logic for providing various communication features to VoIP clients (such as, for example, the communication devices 102a, 102b). Examples of such communication features include (i) connecting incoming calls to the VoIP clients (such as, for example, the communication devices 102a, 102b); and (ii) handling outgoing calls originated from the VoIP clients (such as, for example, the communication devices 102a, 102b). Other examples of communication features that can be performed by the network element 104 can include, but are not limited to call forking, call forwarding, and so on. A non-limiting example of the network element 104 can be embodied in a MCS 5200 Soft Switch manufactured by Nortel Networks Ltd. of 8200 Dixie Road, Brampton, Ontario L6T 5P6, Canada. One skilled in the art will readily appreciate other possible configurations of the network element 104.

Figure 2:
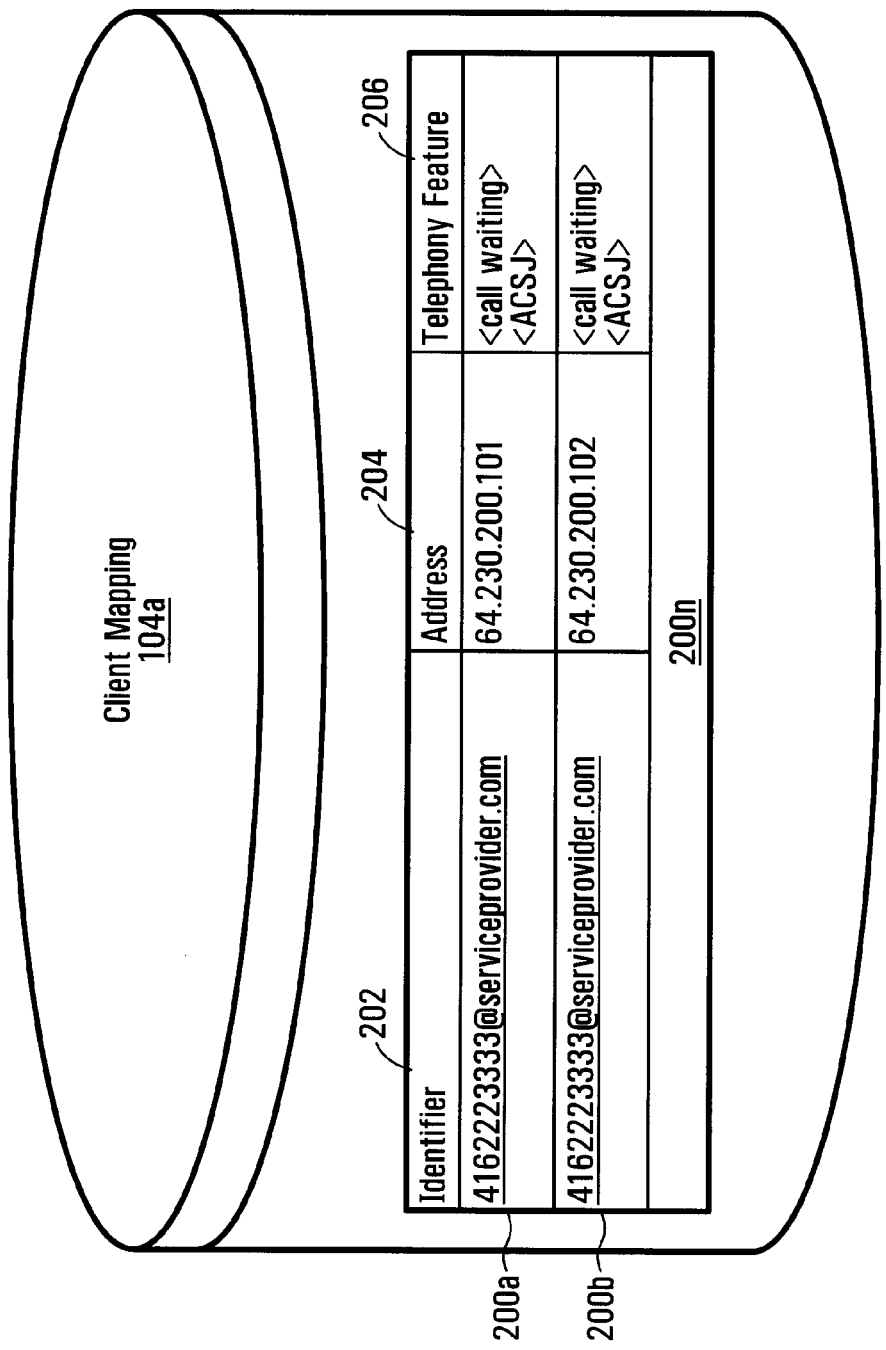
FIG. 2 is a diagram representing a non-limiting embodiment of a client mapping maintained by a network element 104 of FIG. 1.

For the purposes of establishing and terminating communication sessions between one or more of the communication devices 102a, 102b and other communication devices coupled to the communication network 103 (or another communication network), the network element 104 may maintain a client mapping 104a. With reference to FIG. 2 a non-limiting embodiment of a client mapping 104a will now be described in greater detail. The client mapping 104a can be maintained by the network element 104 of FIG. 1 in an internal database. In the specific non-limiting embodiment depicted in FIG. 1, the client mapping 104a is maintained in a separate database accessible to and under control of the network element 104, which is depicted at 104a in FIG. 1. In alternative non-limiting embodiments of the present invention, the database 104a may be coupled to the network element 104 via a direct link, or may be accessible by the network element 104 via the communication network 103 or another communication network.

For the sole purpose of simplifying the description to be presented herein below, it is assumed that the communication network 103 is the data network adapted for handling VoIP calls, the communication device 102a comprises a VoIP phone and the communication device 102b comprises a computing apparatus executing a soft client. It is further assumed that the communication network 103 implements an addressing scheme in accordance with IPv4 protocol. It is further assumed that the communication devices 102a, 102b and the communication network 103 implement a shared communication protocol, such as for example SIP. However, it should be expressly understood that other addressing schemes and communication protocols can be used.

The client mapping 104a may maintain a plurality of records, such as records 200a and 200b. Each of the records 200a and 200b may maintain information about communication device(s) that the network element 104 serves, such as for example, communication devices 102a, 102b. Each of the records 200a and 200b may maintain a relationship between an identifier 202, an address 204 and a telephony feature 206. In a specific non-limiting embodiment, the identifier 202 may comprise an alias or another identifier of a user (such as the user 101), whom a respective communication device is registered to. Some non-limiting examples of the identifier 202 include, but are not limited to, a user account, a proprietary identifier, a network address and the like. In the specific non-limiting embodiment to be presented herein below, the identifier 202 comprises a SIP URI address assigned on a per user account basis or, in other words, all communication devices registered to the same user are associated with the same identifier 202. In the non-limiting example to be presented herein below, communication devices 102a, 102b may be both associated with a single SIP URI "4162223333@serviceprovider.com".

The address 204 may comprise an indication of a network address of the particular communication device, such as, for example, an IP address. The telephony feature 206 may comprise an indication of what telephony functions the user of the particular communication device is a subscriber to. Examples of telephony features indications of which can be stored within telephony feature 206 include, but are not limited to, "call waiting", "voicemail", "three way calling", "differentiated ringing" and the like.

According to non-limiting embodiments of the present invention, another telephony feature an indication of which may be stored within the telephony feature 206 comprises an "active communication session join" or "ACSJ" feature. How the ACSJ feature is provisioned in not particularly limited. In the specific example being presented herein, the ACSJ feature may be provisioned as a trigger within the telephony feature 206. For example, in the non-limiting embodiments of the present invention where the communication network 103 comprises the PSTN, the ACSJ feature may be provisioned as an Off Hook Delay (OHD) trigger in association with the telephony feature 206. One skilled in the art will appreciate that other type of triggers (such as, for example, another AIN trigger) can be used. In an alternative non-limiting embodiment of the present invention, the ACSJ feature may be provided automatically to all subscribers served by the network element 104 and, as such, there may be no need for provisioning of the ACSJ feature within the client mapping 104a.

The record 200a may be associated with the communication device 102a. As such, the identifier 202 of the record 200a may comprise an alias of the user 101 to whom the communication device 102a is registered or, in other words, who is the subscriber to communication services at the customer premises 102, such as, a SIP URI 4162223333@serviceprovider.com. It should be expressly understood that any other suitable form of the identifier 202 can be used, such as a numerical value, an alpha-numerical value, etc. The address 204 of the record 200a may comprise the IP address associated with the communication device 102a, such as, for example, an IP address "64.230.200.101". The telephony feature 206 of the record 200a can comprise "call waiting" and "ACSJ" indicative that the user 101 at the communication device 102a is a subscriber to the call waiting feature, as well as the active communication session join feature contemplated herein.

In a similar manner, the record 200b can be associated with the communication device 102b. Since in the non-limiting example being presented herein, the communication device 102b is associated with the same user 101 at the same customer premises 102 as the communication device 102a, the identifier 202 of the record 200b can comprise an alias of the user 101 who is the subscriber to communication services at the customer premises 102, such as, a SIP URI 4162223333@serviceprovider.com. It should be expressly understood that any other suitable form of the identifier 202 can be used, such as a numerical value, an alpha-numerical value, etc. The address 204 of the record 200b may comprise the IP address associated with the communication device 102b, such as, for example, an IP address "64.230.200.102". The telephony feature 206 of the record 200b can comprise "call waiting" and "ACSJ" indicative that the user 101 at the communication device 102b is a subscriber to the call waiting feature, as well as the active communication session join feature contemplated herein.

The client mapping 104a may maintain a number of additional records, jointly depicted at 200n. These additional records 200n may be associated with other communication devices of the infrastructure of FIG. 1 served by the network element 104 and which have been omitted for the sake of simplicity. How the client mapping 104a is populated is not particularly limited. In a specific non-limiting embodiment of the present invention, the client mapping 104a may be populated during a registration process of the communication devices 102a, 102b. In some non-limiting embodiments of the present invention, the communication devices 102a, 102b may perform the registration process, when the communication devices 102a, 102b are powered on for the first time. In an alternative non-limiting embodiment of the present invention, the communication devices 102a, 102b may perform the registration process after being unplugged and moved to a new location. In yet further non-limiting embodiments of the present invention, the communication devices 102a, 102b can perform the registration process on-demand, for example, when triggered by the user 101, by an application executed on the communication devices 102a, 102b or by an application executed on another device in the customer premises 102 or connected to the communication network 103. For example, each of the records 200a-200n may be assigned an "expiry" indicator. The expiry indicator can be set by the network element 104, it can be requested by the communication device submitting a registration request or it can comprise a default value (ex. 3600 seconds or the like). When the "expiry" indicator expires or shortly thereafter, the network element 104 may cause the respective communication device associated with the expired record 200a-200n to re-execute the registration process.

Naturally, the customer premises 102 may have other users who can use the communication device 102a, 102b such as, for example, a user 101'.

Within the infrastructure of FIG. 1, the user 101 may be further associated with a communication device 106. The communication device 106 can be, for example, embodied in a work telephone located at a place of work (not depicted) where the user 101 works. For the purposes of establishing and terminating communication sessions, the communication device 106 may be coupled to a communication network 108. Even though the nature of the communication device 106 and the communication network 108 is interdependent, it is not particularly limited.

In a first non-limiting embodiment of the present invention, the communication network 108 may comprise a Public Switched Telecommunication Network (PSTN). Within these embodiments, the communication device 106 may comprise a Plain Old Telephone Service (POTS) phone. In a second non-limiting embodiment of the present invention, the communication network 108 may comprise a Private Branch Exchange (PBX). Within these non-limiting embodiments, the communication device 106 may comprise a Plain Old Telephone Service (POTS) phone or an ISDN phone. In a third non-limiting embodiment of the present invention, the communication network 108 may comprise a data network adapted for handling VoIP calls, such as, a public data network (ex. the Internet) or a private data network (ex. a LAN). Within these embodiments of the present invention, the communication device 106 can be implemented in hardware, software, firmware or a combination thereof. In a specific non-limiting example, the communication device 106 may comprise a VoIP phone. It should be understood that within these non-limiting embodiments, the communication device 106 may be also embodied in a Plain Old Telephone System (POTS) phone equipped with an Analog Terminal Adapter (ATA), other computing apparatuses executing soft clients, etc.

For the purposes of the description to be presented below, it is assumed that the communication network 108 comprises the PSTN and the communication device 106 comprises a POTS phone. For the purpose of establishing and terminating communication sessions via the communication network 108, the communication device 106 is associated with a network identifier, which identifies the communication device 106 to the communication network 108. In the specific scenario being presented herein, the communication device 106 can be associated with a telephone number. In alternative embodiments of the present invention, which are particularly applicable where the communication network 108 is the PBX, the communication device 106 may be associated with a PBX extension.

For the purposes of initiating and terminating communication sessions between the communication device 106 and another device coupled to the communication network 108 (or another communication network, such as for example, the communication device 102a coupled to the communication network 103) via the communication network 108, the communication network 108 may comprise a network element 110. In the specific scenario being presented herein where the communication network 108 is the PSTN, the network element 110 may comprise a telephony switch. An example network element 110 can be embodied in a DMS100 or a DMS200 telephony switch provided by Nortel Networks Ltd. One skilled in the art will readily appreciate other possible configurations of the network element 110.

The user 101 may also be associated with a communication device 112, which in a non-limiting example, may be located at a vacation property associated with the user 101, such as a cottage. In the specific example being presented herein, where the communication network 108 comprises the PSTN, the communication device 112 may be also coupled to the communication network 108. The communication device 112 may comprise a POTS phone, whether wired or wireless. The communication device 112 may be also associated with a telephone number, such as a telephone number "222.333.4444".

Figure 3:
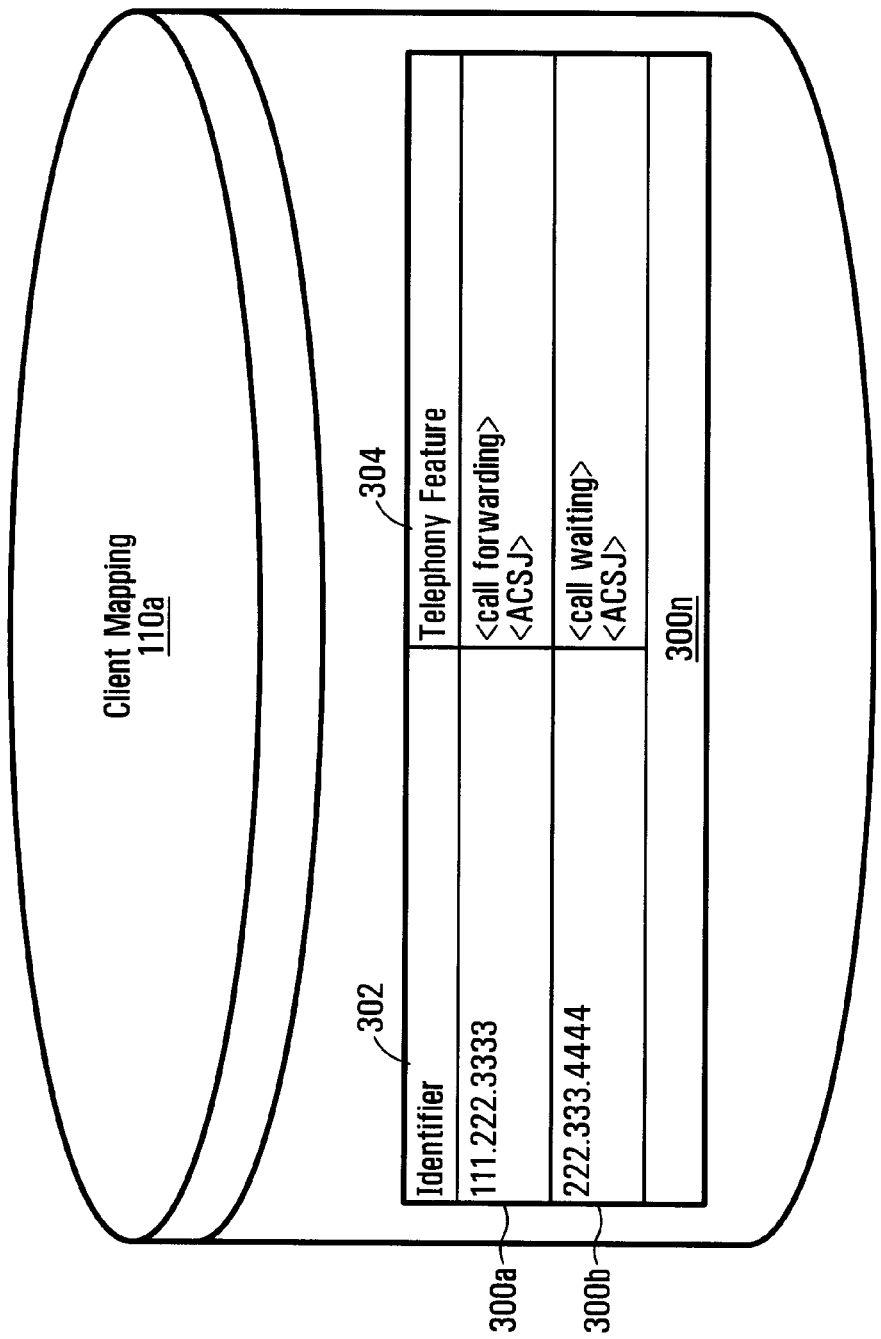
FIG. 3 is a diagram representing a non-limiting embodiment of a client mapping maintained by a network element 110 of FIG. 1.

For the purposes of establishing and terminating communication sessions between the communication device 106 or the communication device 112 and other communication devices coupled to the communication network 108 (or another network, such as for example the communication network 103), the network element 110 may maintain a client mapping 110a. With reference to FIG. 3, a non-limiting embodiment of a client mapping 110a will now be described in greater detail. The client mapping 110a can be maintained by the network element 110 of FIG. 1 in an internal database. In the specific non-limiting embodiment depicted in FIG. 1, the client mapping 110a is maintained in a separate database accessible to and under control of the network element 110, which is depicted at 110a in FIG. 1. In alternative non-limiting embodiments of the present invention, the database 110a may be coupled to the network element 110 via a direct link, or may be accessible by the network element 110 via the communication network 108 or another communication network.

The client mapping 110a may be substantially similar to the client mapping 104a of FIG. 2 maintained by the network element 104. As such, the client mapping 110a may maintain a plurality of records, such as records 300a and 300b. Each of the records 300a and 300b may maintain information about communication devices that the network element 110 serves, such as for example, the communication devices 106, 112 served by the network element 110. Each of the records 300a and 300b may maintain a relationship between an identifier 302 and a telephony feature 304. In the specific non-limiting example being presented herein, the network identifier 302 may comprise a telephone number of the respective communication device.

The telephony feature 304 may comprise an indication of what telephony features the user of the particular communication device is a subscriber to. Examples of telephony features indications of which may be stored within telephony feature 304 include, but are not limited to, "call waiting", "voicemail", "three way calling", "differentiated ringing" and the like. According to non-limiting embodiments of the present invention, another telephony feature an indication of which may be stored within the telephony feature 304 comprises an "active communication session join" or "ACSJ" feature. How the ACSJ feature is provisioned in not particularly limited. In the specific example being presented herein, the ACSJ feature may be provisioned as an Off Hook Delay (OHD) trigger in association with the telephony feature 304. In an alternative non-limiting embodiment of the present invention, the ACSJ feature may be provided automatically to all subscribers served by the network element 110 and, as such, there may be no need for provisioning of the ACSJ feature within the client mapping 110a.

The record 300a may be associated with the communication device 106. As such, the identifier 302 of the record 300a may comprise the telephone number assigned to the communication device 106, such as a telephone number "111-222-3333". The telephony feature 304 of the record 300a can comprise "call forwarding" and "ACSJ" indicative that the user 101 at the communication device 106 is a subscriber to the call forwarding feature, as well as the active communication session join feature contemplated herein.

The record 300b may be associated with the communication device 112. As such, the identifier 302 of the record 300b may comprise the telephone number assigned to the communication device 112, such as a telephone number "222-333-4444". The telephony feature 304 of the record 300b can comprise "call waiting" and "ACSJ" indicative that the user 101 at the communication device 112 is a subscriber to the call waiting feature, as well as the active communication session join feature contemplated herein.

The client mapping 110a may maintain a number of additional records, jointly depicted at 300n. These additional records 300n may be associated with other communication devices of the infrastructure of FIG. 1 served by the network element 110 and which have been omitted for the sake of simplicity. How the client mapping 110a is populated is not particularly limited. In a specific non-limiting embodiment of the present invention, the client mapping 110a may be populated when telephony service is provisioned to the communication devices 106, 112. The client mapping 110a may be updated from time to time, for example when the user 101 adds a remove a specific telephony feature from the subscription profiles of the respective communication devices 106, 112.

Within the infrastructure of FIG. 1, the user 101 may be further associated with a communication device 114. The communication device 114 can, for example, be embodied in a wireless communication device of the user 101. For the purposes of establishing and terminating communication sessions, the communication device 114 may be coupled to a communication network 116, which can be embodied in a wireless communication network. In a specific non-limiting embodiment of the present invention, the communication network 116 comprises a CDMA-based wireless communication network. In alternative non-limiting embodiments of the present invention, the communication network 116 may be based on other wireless standards, such as, for example, TDMA, FDMA, Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN), EVDO, WiMax and the like.

Within some of these embodiments, such as, for example, where the communication network 116 is embodied in the CDMA wireless network, the communication network 116 comprises a number of base stations (not depicted) providing a coverage area for the communication network 116. It is commonly said that each base station is associated with a cell of the coverage area of the communication network 116. Accordingly, the base station is sometimes referred to by those of skill in the art as a "cell site". The communication device 114 may be embodied in a cellular phone, a Personal Digital Assistant (PDA), a Blackberry® device, a Palm® device, a computer equipped with a wireless access card (e.g. EV-DO, etc.) executing a soft client and the like.

For the purpose of establishing and terminating communication sessions via the communication network 116, the communication device 114 is associated with a network identifier, which identifies the communication device 114 to the communication network 116. In the specific scenario being presented herein, the communication device 114 can be associated with a telephone number "333.444.5555". In alternative embodiments of the present invention, the communication device 114 can be associated with another type of network addresses, such as, for example, an IP address, a MAC address and the like.

For the purposes of initiating and terminating communication sessions between the communication device 114 and another device coupled to the communication network 116 (or another communication device coupled to another communication network, such as for example, the communication device 102a coupled to the communication network 103 or the communication device 112 coupled to the communication network 108), via the communication network 116, the communication network 116 may comprise a network element 118. In the specific scenario being presented herein where the communication network 116 is the CDMA wireless communication network, the network element 118 may comprise a wireless telephony switch. An example network element 118 can be embodied in a DMS-MTX wireless switch provided by Nortel Networks Ltd. One skilled in the art will readily appreciate other possible configurations of the network element 118.

The network element 118 can perform substantially the same functions as the network element 104 or the network element 110. However, the network element 118 can perform some additional functions, such as effecting a "soft" or a "hard" handoff between a first base station and a second base station as the user 101 employing the communication device 114 moves from a coverage area of the first base station to a coverage area of the second base station.

Figure 4:
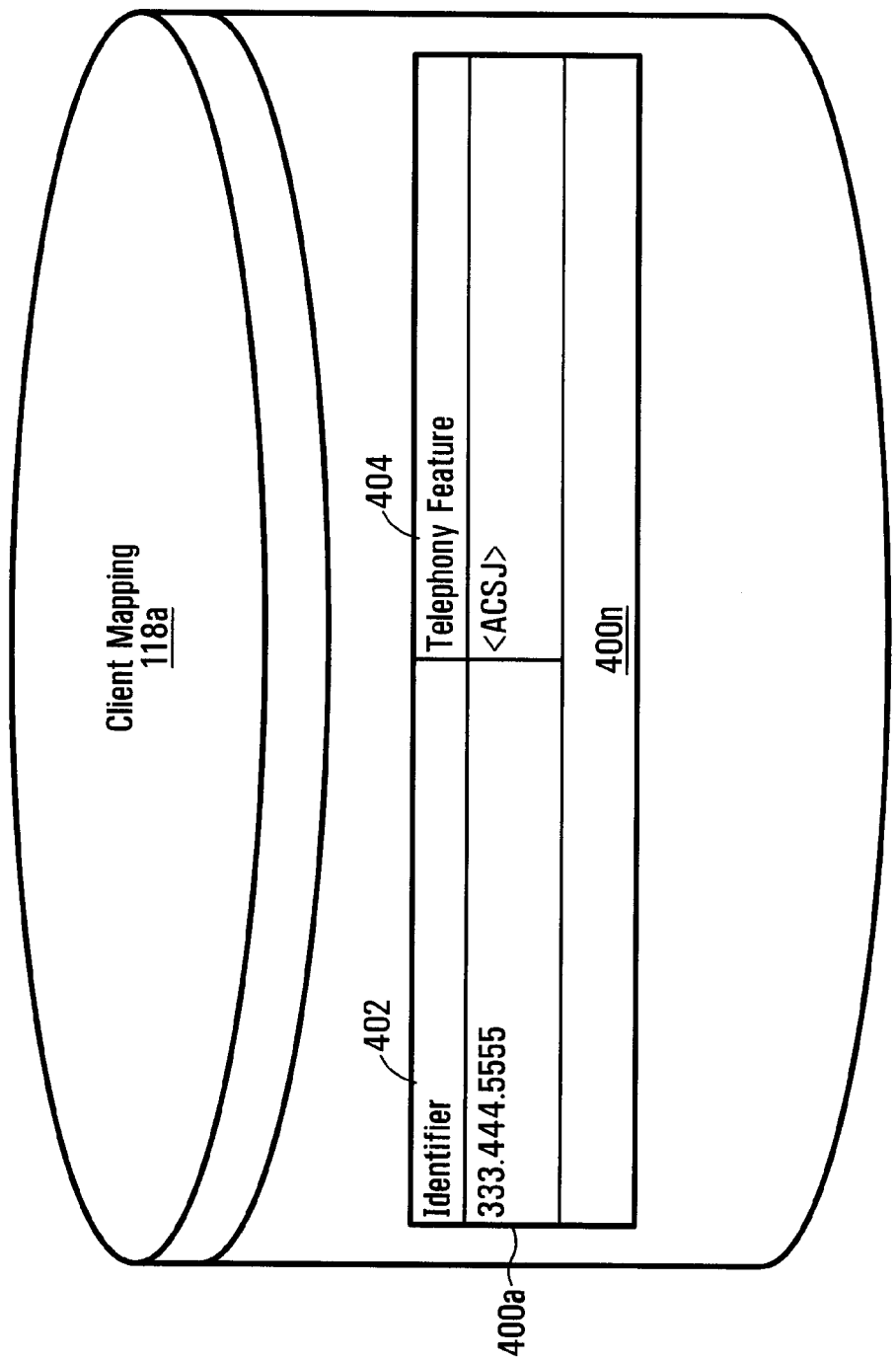
FIG. 4 is a diagram representing a non-limiting embodiment of a client mapping maintained by a network element 118 of FIG. 1.

For the purposes of establishing and terminating communication sessions between the communication device 114 and other communication devices coupled to the communication network 116 (or another communication device coupled to another communication network, such as for example, the communication device 102a coupled to the communication network 103 or the communication device 112 coupled to the communication network 108), the network element 118 may maintain a client mapping 118a. With reference to FIG. 4 a non-limiting embodiment of a client mapping 118a will now be described in greater detail. The client mapping 118a can be maintained by the network element 118 of FIG. 1 in an internal database. In the specific non-limiting embodiment depicted in FIG. 1, the client mapping 118a is maintained in a separate database accessible to and under control of the network element 118, which is depicted at 118a in FIG. 1. In alternative non-limiting embodiments of the present invention, the database 118a may be coupled to the network element 118 via a direct link, or may be accessible by the network element 118 via the communication network 116 or another communication network.

The client mapping 118a may be substantially similar to the client mapping 104a of FIG. 2 and/or the client mapping 110a of FIG. 3. As such, the client mapping 118a may maintain a plurality of records, such as a record 400a. The record 400a may maintain information about communication devices that the network element 118 serves. The record 400a may maintain a relationship between an identifier 402 and a telephony feature 404. In a specific non-limiting embodiment, the identifier 402 may comprise a telephone number of the respective communication device.

The telephony feature 404 may comprise an indication of what telephony features the user of the particular communication device is a subscriber to. Examples of telephony features indications of which may be stored within telephony feature 404 include, but are not limited to, "call waiting", "voicemail", "three way calling", "differentiated ringing" and the like. According to non-limiting embodiments of the present invention, another telephony feature an indication of which may be stored within the telephony feature 404 comprises an "active communication session join" or "ACSJ" feature. How the ACSJ feature is provisioned in not particularly limited. In the specific example being presented herein, the ACSJ feature may be provisioned as a Wireless IN (WIN) trigger in association with the telephony feature 404. In an alternative non-limiting embodiment of the present invention, the ACSJ feature may be provided automatically to all subscribers served by the network element 118 and, as such, there may be no need for provisioning of the ACSJ feature within the client mapping 118a.

The record 400a may be associated with the communication device 114. As such, the identifier 402 of the record 400a may comprise the telephone number assigned to the communication device 114, such as a telephone number "333-444-5555". The telephony feature 404 of the record 400a can comprise "ACSJ" indicative that the user 101 at the communication device 114 is a subscriber to the active communication session join feature contemplated herein.

The client mapping 118a may maintain a number of additional records, jointly depicted at 400n. These additional records 400n may be associated with other communication devices of the infrastructure of FIG. 1 served by the network element 118 and which have been omitted for the sake of simplicity. How the client mapping 118a is populated is not particularly limited. In a specific non-limiting embodiment of the present invention, the client mapping 118a may be populated at the time when the wireless telephony service for the communication device 114 is provisioned. The client mapping 118a may be updated from time to time, for example when the user 101 adds or removes a specific telephony feature from the subscription profile of the communication devices 114.

Returning to the description of FIG. 1, in addition to the functionality described above, in some embodiments of the present invention, all of the network elements 104, 110, 118 comprise suitable circuitry, software and/or control logic for exchanging calls with entities outside the respective communication networks 103, 108, 116. In an alternative non-limiting embodiment of the present invention, each of the communication networks 103, 108 and 116 may comprise a media gateway (not depicted) for facilitating the exchange of media with the other media gateways of the communication networks 103, 108, 116. In yet further non-limiting embodiments of the present invention, the infrastructure of FIG. 1 may comprise a single media gateway (not depicted) accessible by the network elements 104, 110, 118 for mediating communications between their respective communication networks 103, 108, 116.

For illustration purposes only, take the example of the communication network 103. In a first non-limiting scenario, the network element 104 of the communication network 103 may comprise the suitable circuitry, software and/or control logic for exchanging data with the communication network 108 and the communication network 116. For example, a first sub-routine may be responsible for exchanging data with the communication network 108 and a second sub-routine may be responsible for exchanging data with the communication network 116. In another non-limiting scenario, the communication network 103 may comprise a media gateway (not depicted) responsible for exchanging data with the communication network 108 and the communication network 116. In another non-limiting scenario, the communication network 103 may comprise a first media gateway (not depicted) for exchanging data with the communication network 108 and a second media gateway (not depicted) responsible for exchanging data with the communication network 116. Substantially similar scenarios and alternatives can be implemented for the communication networks 108, 116.

The infrastructure of FIG. 1 may further comprise an application server 130. In some non-limiting embodiments of the present invention, the functionality of the application server 130 can be incorporated into the functionality of one of the network elements 104, 110 and 116. However, in the specific non-limiting embodiment depicted in FIG. 1, the application server 130 is embodied in a stand-alone computing apparatus. An example application server 130 can be embodied as a Ubiquity Application Server, which can be provided by Ubiquity Software Corporation of 515 Legget Drive, Suite 400, Ottawa, ON, Canada. One skilled in the art will readily appreciate other possible configurations of the application server 130. It should be expressly understood that some of the functions performed by the application server 130 to be described herein below can be executed in a distributed manner by one or more computing apparatuses. In some alternative non-limiting embodiments of the present invention, the functionality of the application server 130 can be distributed among some or all of the network elements 104, 110, 118. An example of such a distributed implementation will be described in greater detail herein below with reference to FIG. 10.

The application server 130 can be reachable by the network elements 104, 110 and 118 via a data network (not separately numbered). In some non-limiting embodiments of the present invention, the data network may comprise portions of one or more of the communication networks 103, 108, 116. In alternative non-limiting embodiments of the present invention, the data network can be a separate data network, such as the Internet or another type of a public or a private data network.

The network elements 104, 110 and 118 are aware of a location of the application server 130 or, in other words, of a network address 132 associated with the application server 130. In some embodiments of the present invention, the network address 132 may comprise a static network address, such as, but not limited to, a static IP address. In these embodiments of the present invention, the network elements 104, 110 and 118 may be pre-programmed with the static IP address of the application server 130. In an alternative embodiment of the present invention, the network address 132 may comprise a Uniform Resource Locator (URL), such as, for example, "www.applicationserver.com". In these non-limiting embodiments of the present invention, the network elements 104, 110, 118 may be pre-programmed with the URL of the application server 130. In yet further non-limiting embodiments of the present invention, the network address 132 may comprise a dynamic network address, such as, for example, a dynamic IP address. In these non-limiting embodiments of the present invention, the network elements 104, 110, 118 may discover the dynamic IP address of the application server 130 via an appropriate address discovery procedure, such as, for example, a Domain Name Service (DNS) look up.

Given the infrastructure of FIG. 1, it is possible to perform a method for causing a communication device to join an active communication session. The method for causing a communication device to join the active communication session will be described as being performed in two phases:

Phase I: a registration phase with reference to FIG. 5 (referred to herein below as a "method for registration");

Phase II: an in-use phase with reference to FIG. 6 (referred to herein below as a "method in-use").

It should be noted that the method for registration can be performed once. However, portions of the method for registration can be re-executed from time to time, when certain parameters of the registration need to be changed. The method for registration should be performed before the first instance of the method in-use can be executed.

Figure 5:
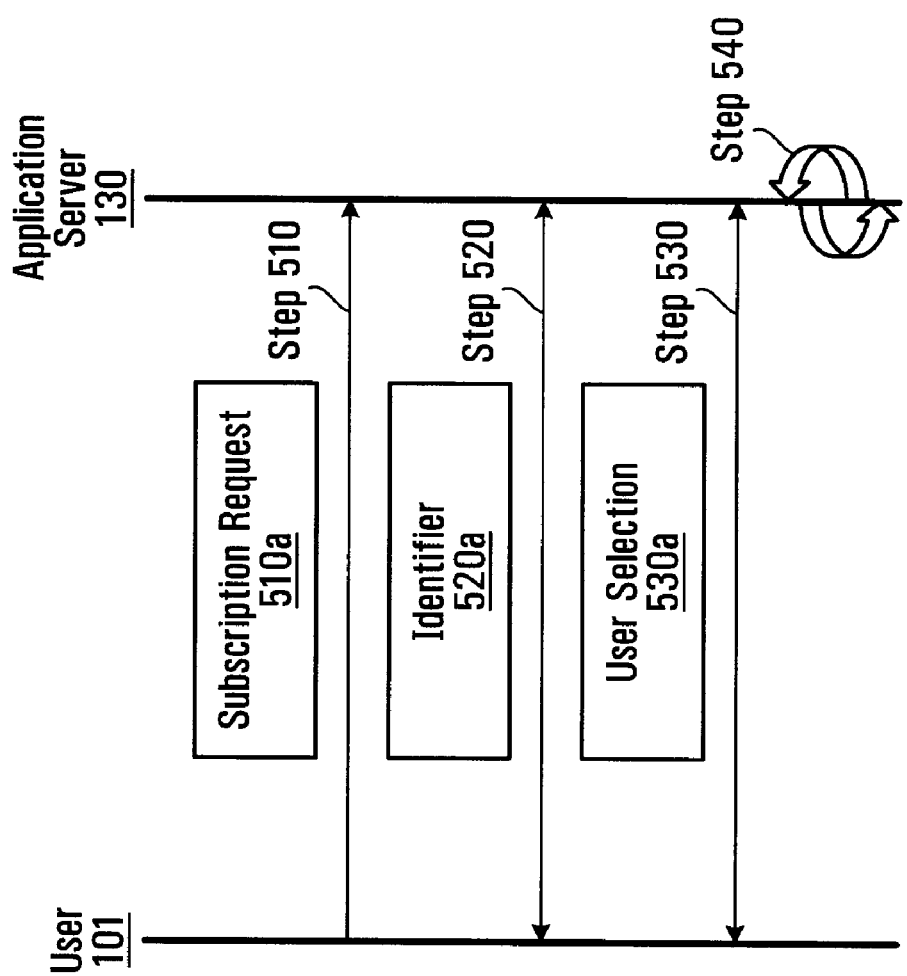
FIG. 5 is a flow chart representing a non-limiting embodiment of a method for registration executed within the infrastructure of FIG. 1.
Figure 6:
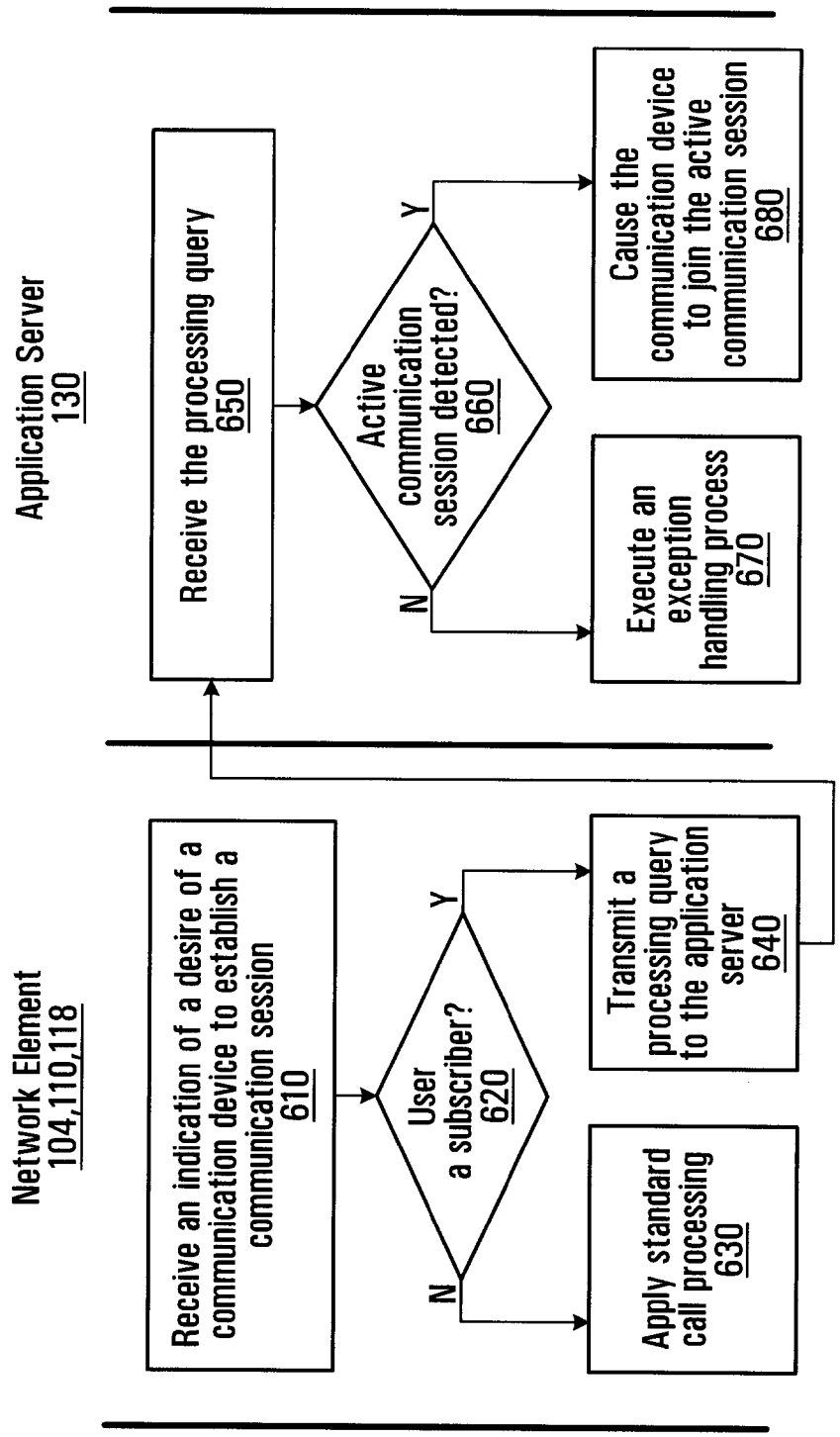
FIG. 6 is a flow chart representing a non-limiting embodiment of a method for causing a communication device to join an active communication session ("in-use") executed within the infrastructure of FIG. 1.
Figure 7:
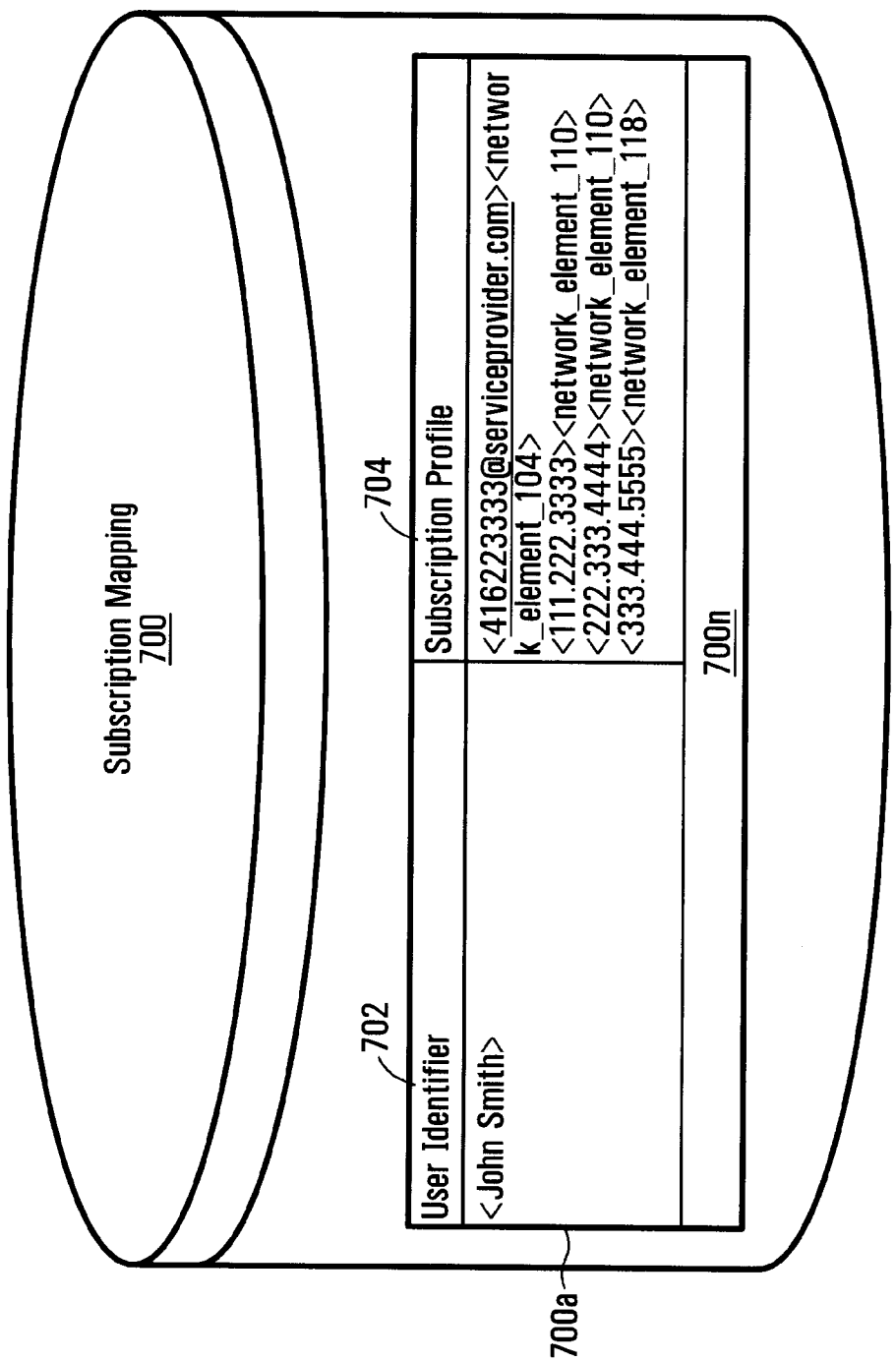
FIG. 7 is a diagram representing a non-limiting embodiment of a subscription mapping maintained by an application server of FIG. 1.

Before describing the methods of FIGS. 5 and 6 in detail, a subscription mapping 700 of FIG. 7 will now be introduced. The subscription mapping 700 can be maintained by the application server 130 of FIG. 1 in an internal database. In the specific non-limiting embodiment of FIG. 1, the subscription mapping 700 may be maintained in a separate database, accessible to and under control of the application server 130. In alternative non-limiting embodiments of the present invention, where the functionality of the application server 130 is distributed among the network elements 104, 110, 118, the subscription mapping 700 can be distributed, for example, among the client mappings 104a, 110a, 118a.

The subscription mapping 700 may maintain a plurality of records, such as a record 700a, for example. Each of the plurality of records maintains information about users who subscribe to the active communication session join feature contemplated herein, as well as details of their respective subscription profiles.

To that end, the record 700a maintains a relationship between a user identifier 702 and a subscription profile 704. For illustration purposes, it is assumed that record 700a is associated with the user 101. The user identifier 702 of a particular record contains data that uniquely identifies the user with whom the particular record is associated. In a first non-limiting embodiment of the present invention, the user identifier 702 may contain a user name, such as a numeric or an alphanumeric string of characters. In another non-limiting embodiment of the present invention, the user identifier 702 may comprise a network identifier associated with one of the communication devices associated with the user with whom the particular record is associated. In the example of the user 101, an identifier of one of the communication devices 102a, 102b, 106, 112, 114 can be maintained within the user identifier 702 of the record 700a for signifying that the record 700a is associated with the user 101. In the specific non-limiting example to be presented herein below, the user identifier 702 of the record 700a comprises "John Smith" which represents the user identifier assigned to the user 101. The user identifier 702 may further comprise an indication of a password assigned to the user 101 that can be used for verifying identity of the user 101. Naturally, the indication of the password can be stored in a separate field of the subscription mapping 700 or in a separate database.

The subscription profile 704 comprises an indication of network identifiers of communication device(s) that the user 101 has subscribed for the purposes of the active communication session handling feature contemplated herein. These communication device(s) are referred to sometimes herein below as "subscribing communication device(s)". By virtue of their registration, the subscribing communication devices can also be referred to as communication devices registered in association with a "device group". For the purposes of the description to be presented herein below, it is assumed that the user 101 has registered all communication devices 102a, 102b, 106, 112 and 114 for the purposes of the active communication session handling feature contemplated herein. How the user 101 can register the communication devices 102a, 102b, 106, 112 and 114 will be described in greater detail herein below.

To that end, the subscription profile 704 comprises an indication of network identifiers of each one of the subscribing communication devices. In some embodiments of the present invention, the subscription profile 704 may further comprise an indication of which communication network each of the subscribing communication devices is associated with, for example, by storing a network address associated with a network element (such as, for example, network elements 104, 110, 118) associated with the respective communication networks (such as, for example, communication networks 103, 108, 116) associated with the respective subscribing communication device(s). Within the specific non-limiting embodiment being depicted in FIG. 7, the subscription profile 704 comprises (i) the indication of a respective network identifier of each one of the subscribing communication device(s) and (ii) an indication of the network element(s) responsible for handling communications on behalf of each one of the subscribing communication device(s):

```
<416223333@serviceprovider.com><network_element_104>
  <111.222.3333><network_element_110>
  <222.333.4444><network_element_110>
  <333.444.5555><network_element_118>
```

In an alternative non-limiting embodiment of the present invention, the subscription profile 704 may comprise just the indication of the respective network element(s) responsible for handling communication on behalf of each one of the subscribing communication device(s). An example of such an embodiment will be described in greater detail herein below.

How the application server 130 becomes aware of the indication of the respective network element(s) responsible for handling communication on behalf of each one of the subscribing communication device(s) will be described in greater detail herein below.

The subscription mapping 700 may maintain a number of additional records associated with other subscribers and their respective subscribing communication device(s). The additional records are jointly depicted at 700n.

In an alternative non-limiting implementation of the subscription mapping 700, the user identifier 702 may be omitted and the subscription mapping 700 may simply maintain a number of subscription profiles 704. In yet further non-limiting embodiments of the present invention, the subscription mapping 700 may be omitted altogether. Within these non-limiting embodiments of the present invention, the application server 130 can probe the network elements 104, 110, 118 for the indication of subscribing communication device(s) as will be described in greater detail herein below.

With reference to FIG. 5 a method for registration according to a non-limiting embodiment of the present invention will now be described.

Step 510

The method begins at step 510, where a subscription request 510a is received from the user 101 by the application server 130. Several scenarios for how the user 101 can submit the subscription request 510a are contemplated.

In a first non-limiting scenario, the user 101 can access a web portal maintained by a service provider associated with the application server 130. The user 101 can access the web portal, for example, using the communication device 102b, which in the example being presented herein is embodied in a computing apparatus. The user 101 can, of course, use any other computing apparatus for accessing the web portal. The user 101 can then click on a dedicated registration link, a dedicated registration button, etc. to indicate his or her desire to start the registration process.

In a second non-limiting scenario, the user 101 can call and interact with a service representative or an interactive voice response (IVR) system associated with the service provider who manages the application server 130.

Irrespective of how the user 101 submits the subscription request 510a, the subscription request 510a is transmitted to the application server 130 (in case of the web portal and the IVR system) or inputted into an input interface of the application server 130 by the service representative.

Step 520

The user 101 is associated with an identifier 520a in step 520. In some non-limiting embodiments of the present invention, the user 101 is assigned an alphanumerical or a numerical identifier by the application server 130 via the web portal, or by the service representative or the IVR system. In an alternative non-limiting embodiment, the user 101 can select and provide to the application server 130 via the web portal, or to the service representative or the IVR system a user-selected alphanumerical, or a numerical identifier. In yet further non-limiting embodiments of the present inventions, the user 101 may provide to the application server 130 via the web portal, to the service representative or the IVR system an indication of a network identifier of one of the communication device(s) that the user 101 intends to subscribe with the application server 130 for the purposes of the active communication session joining feature contemplated herein, this network identifier can be used as the identifier 520a (such as, for example, a telephone number, etc.).

For the purposes of the example to be presented herein below, it is assumed that the user 101 has been assigned by the application server 130 a user identifier "John Smith" via the web portal, which may, but does not necessarily have to, be indicative of the user's 101 first and last names. In some embodiments of the present invention, the user 101 may be assigned or may choose a password which can be used for verification of user's 101 identity at a later time.

In an alternative non-limiting embodiment of the present invention, the application server 130 can implement the step 520 without advising the user 101 of the identifier 520a.

Step 530

Next, at step 530, a user's selection 530a is received by the application server 130. The user's selection 530a may be indicative of the network identifier(s) of one or more of the communication device(s) that the user 101 intends to subscribe with the application server 130 for the purposes of the active communication session joining feature contemplated herein.

Step 530 may be executed at the same time as steps 510 and 520 are executed. In this scenario, the user 101 provides the user's selection 530a via the same means as the subscription request 510a was submitted, i.e. via the web portal, to the service representative or to the IVR system. In the example being presented herein, the user 101 interacts with the web portal and provides the user's selection 530a indicative of network addresses of the communication devices that the user 101 wishes to subscribe:

<416223333@serviceprovider.com>
<111.222.3333>
<222.333.4444>
<333.444.5555>

Naturally, the user 101 does not need to subscribe all communication devices at the same time. Actually, the user 101 can subscribe or unsubscribe any number of communication devices at any given time. In an alternative non-limiting embodiment of the present invention, a customer service representative may provide an indication of the subscribing communication devices on behalf of the user 101. In yet further embodiments of the present invention, the user's selection 530a can be generated automatically, for example, the user's selection 530a can be generated to include a set of network identifiers of communication devices located at a given dwelling (such as, for example, the customer premises 102, etc.).

Step 540

Next, at step 540, the application server 130 generates the aforementioned record 700a associated with the user 101. To that end, the application server 130 examines the identifier 520a with which the user 101 was associated in step 520 and the user's selection 530a received in step 530. The application server 130 populates the user identifier 702 with the identifier 520a. The application server 130 then populates the subscription profile 704 with the user's selection 530a.

In some embodiments of the present invention, the application server 130 may further determine which network element(s) are responsible for handling communications on behalf of the subscribing communication device(s) being provisioned by the user 101. How the application server 130 determines this is not particularly limited. For example, in some non-limiting embodiments of the present invention, an association between a given subscribing communication device and the associated network element can be inherent in the network identifier associated with the given subscribing communication device. Within this scenario, the application server 130 can determine which network element is responsible for handling communications on behalf of the given communication device based on the network identifier of the given communication device. In an alternative non-limiting embodiment of the present invention, the application server 130 may perform a look-up to determine which network element is responsible for handling communications on behalf of the given communication device, for example by contacting a DNS server (not depicted), etc.

It should be understood that the user 101 may re-execute step 520 from time to time when the user 101 needs to change data maintained within the subscription profile 704. The user may execute a step substantially similar to step 510, where the user 101 accesses the web portal, interacts with the service representative or the IVR system. The user 101 first provides the identifier 520a to identify himself or herself. The user 101 may further need to provide a password an indication of which may be stored within the user identifier 702. The user 101 then indicates any network identifiers of the subscribing communication device(s) that need to be removed or network identifiers or new communication device(s) to be subscribed. Step 540 can then be re-executed to update the subscription profile 704.

With reference to FIG. 6, the method in-use according to a non-limiting embodiment will now be described in greater detail. For the purposes of the description to be presented herein below, it is assumed that the subscription mapping 700 of FIG. 7 has been populated.

For the purposes of providing non-limiting examples and illustrations for the method in-use of FIG. 6, the following illustrative scenarios will be used:

Scenario 1 In this scenario, it assumed that the user 101 is driving towards the cottage where the communication device 112 is located and is currently engaged in an active communication session using the communication device 114. Once the user 101 arrives at the cottage, the user 101 is desirous of using the communication device 112 to join the active communication session. It should be recalled that the communication device 112 comprises a POTS phone and that the communication device 114 comprises a wireless communication device.

Scenario 2 In this scenario, it is assumed that the user 101 is at the customer premises 102 and is currently engaged in an active communication session using the communication device 102a. It is further assumed that the user 101 is about to leave the customer premises 102 and, as such, is desirous of using the communication device 114 to join the active communication session. It should be recalled that the communication device 102a is embodied in a VoIP phone.

Step 610

The method in-use begins at step 610, at which an indication of the desire of a communication device to establish a communication session is received by a network element (such as, one of the network elements 104, 110, 118).

Scenario 1 In a first non-limiting embodiment of the present invention, the indication of the desire of the communication device to establish the communication session may be assumed to signify that the user 101 is desirous of joining the active communication session in progress with another subscribing communication device (if such active communication session does exist). This is particularly applicable in Scenario 1.

In this scenario, the network element 110 ascertains the desire of the communication device 112 to establish the communication session, for example, by detecting an off-hook condition. For example, when the user 101 arrives at the cottage where the communication device 112 is located, the user 101 may pick up a receiver of the communication device 112. The network element 110 detects an off-hook condition at the communication device 112.

Scenario 2 In a second non-limiting embodiment of the present invention, the user 101 has to positively provide the indication of the desire to establish a communication session. This approach is particularly applicable in Scenario 2.

In this scenario, the network element 118 ascertains the desire of the communication device to establish the communication session in the following manner. For example, when the user 101 is about to leave the customer premises 102, the user 101 may use the communication device 114 to enter a pre-determined short code, such as for example, "*11", "#5" or the like. Alternatively, the user 101 may press a pre-determined button of the communication device 114. For example, the user 101 may press a "SEND" button without previously inputting a destination number. Responsive to the user 101 entering the pre-determined short code or pressing the pre-determined button, the communication device 114 establishes a communication session with the network element 118.

It should be noted that the above two scenarios have been provided as examples only. In practice, a myriad of suitable ways for triggering transmission of indication of the desire of the communication device to join the communication session are possible. Some further non-limiting examples will be provided herein below as part of the description of FIG. 8.

Step 620

At step 620, the network element (such as one of the network elements 104, 110, 118) determines if the communication device that has indicated the desire to establish the communication session at step 610 has been provisioned with the active communication session joining feature contemplated herein.

Firstly, the network element (such as one of the network elements 104, 110, 118) determines the network identifier associated with the communication device that has provided the indication of the desire to establish the communication session in step 610.

Scenario 1 Within this non-limiting scenario, the network element 110 determines the network identifier of the communication device 112 that has provided the indication of the desire to establish the communication session in step 610. More specifically, the application server 130 determines that the communication device 112 is associated with a telephone number 222.333.4444.

Scenario 2 Within this non-limiting scenario, the network element 118 determines the network identifier of the communication device 114 that has provided the indication of the desire to establish the communication session in step 610. More specifically, the application server 130 determines that the communication device 114 is associated with a telephone number 333.444.5555.

Next, the network element (such as one of the network elements 104, 110, 118) determines if the communication device that has provided the indication of the desire to establish the communication session in step 610 has been provisioned with the active communication session joining feature contemplated herein.

Scenario 1 The network element 110 then accesses the aforementioned client mapping 110a to determine whether any special features have been provisioned in association with the communication device 112. Based on, for example, network identifier associated with the communication device 112, the network element 110 accesses the record 300b associated with the communication device 112 to determine whether the communication device 112 has been provisioned with the active communication session joining feature contemplated herein.

Scenario 2 The network element 118 accesses the aforementioned client mapping 118a to determine whether any special features have been provisioned in association with the communication device 114. Based on, for example, the network identifier associated with the communication device 114, the network element 118 accesses the record 400a associated with the communication device 114 and determines that the communication device 114 has been provisioned with the active communication session joining feature.

In an alternative non-limiting embodiment of the present invention, which are particularly applicable where the ACSJ feature is automatically applied to all subscribers, step 620 (and step 630 to be described below) can be omitted.

Step 630

If it is determined that the communication device that has provided the indication of the desire to establish the communication session in step 610 is not provisioned with the active communication session handling feature contemplated herein (i.e. the "NO" branch of step 620), the network element (such as one of the network elements 104, 110, 118) can apply standard call processing at step 630 to the communication device that has indicated the desire to establish the communication session at step 610.

Scenario 1 The network element 110 can cause the communication device 112 to emit a dial tone, the dial tone for indicating to the user 101 to dial a telephone number to establish a new communication session.

Scenario 2 The network element 118 can cause the communication device 114 to present the user 101 a message offering the user 101 to subscribe to the active communication session joining feature or to establish a new communication session. This message can be an audio message, a textual message, a graphic-based message, a combination thereof, etc.

Step 640

If it is determined that the communication device that has provided the indication of the desire to establish the communication session in step 610 is provisioned with the active communication session handling feature contemplated herein (i.e. the "YES" branch of step 620), the network element (such as one of the network elements 104, 110, 118) executes step 640.

Scenario 1 Responsive to the determination at step 620, the network element 110 invokes an OHD trigger. Responsive to invoking of the OHD trigger, the network element 110 stops standard call processing and transmits a processing query to the application server 130 requesting a processing instruction.

Scenario 2 Responsive to this determination at step 620, the network element 118 invokes a WIN trigger. Responsive to invoking of the WIN trigger, the network element 118 stops standard call processing and transmits a processing query to the application server 130 requesting a processing instruction.

Step 650

Next, at step 650, the application server 130 receives the processing query from the network element (such as one of the network elements 104, 110, 118).

Step 660

Responsive to the receipt of the processing query at step 650, at step 660, the application server 130 determines if an active communication session is in progress with at least one other subscribing communication device associated with the user 101 associated with the communication device that has provided the indication of the desire to establish the communication session in step 610.

The application server 130 then accesses the aforementioned subscription mapping 700 and determines which record of the subscription mapping 700 contains the network identifier of the communication device that has provided the indication of the desire to establish the communication session in step 610. In the specific example being presented herein (in both scenarios 1 and 2), the application server 130 determines that the record 700a contains the network identifier of the communication device that has provided the indication of the desire to establish the communication session in step 610. The application server 130 then examines the subscription profile 704 of the record 700a and retrieves network identifiers of other subscribing communication device(s) associated with the user identifier 702 associated with the user 101.

The application server 130 then determines if any of the other subscribing communication device(s) associated with the user 101 are engaged in an active communication session. Several non-limiting embodiments of how this may be implemented are contemplated:

"Pull mechanism"

In a first non-limiting scenario, the application server 130 may query each network element 104, 110, 118 responsible for handling communication sessions for subscribing communication devices 102a, 102b, 106, 112, 114 in order to determine if at least one of the subscribing communication devices 102a, 102b; 106, 112, 114 is engaged in the active communication session. It will be recalled that the subscription profile 704 of the subscription mapping 700 may comprise an indication of the network element responsible for handling communication sessions on behalf of subscribing communication device(s). Having the benefit of this knowledge, the application server 130 may contact each of the network elements responsible for handling communication sessions on behalf of the subscribing communication device(s).

"Push mechanism"

In a second non-limiting scenario, each of the network elements 104, 110, 118 can transmit to the application server 130 an indication when a status of a particular communication device that the respective network element 104, 110, 118 serves changes (for example, when a particular communication device goes from on hook to off hook and vice versa).

In an alternative non-limiting embodiment of the present invention, each of the network elements 104, 110, 118 may periodically (such as, for example, every 30 seconds, every minute, every 2 minutes, etc.) send an update to the application server 130 representative of which communication devices served by a respective network element 104, 110, 118, and which have been provisioned with the active communication session joining feature in their respective client mappings 104a, 110a, 118a, are engaged in an active communication session at the time of sending the update. The application server 130 may store an indication of which of the subscribing communication devices are currently engaged in an active communication session within the aforementioned subscription mapping 700. Within this non-limiting scenario, the application server 130 accesses the subscription mapping 700 in order to determine if at least one of the subscribing communication devices 102a, 102b; 106, 112, 114 (other than the communication device that has provided the indication of the desire to establish the communication session at step 610) is engaged in an active communication session.

"Via mechanism"

In an alternative non-limiting embodiments of the present invention, the calls for any of the subscribing communication devices (such as, for example, the communication devices 102a, 102b, 106, 112, 114) can be routed through the application server 130, which will allow the application server 130 to be aware of all active sessions associated with the subscribing communication devices.

Naturally, the application server 130 may determine that more than one of the subscribing communication devices 102a, 102b, 106, 112, 114 are currently engaged in an active communication session. An optional enhancement will be described herein below that may assist in dealing with this situation.

It should be expressly understood that there is a number of alternative implementations for step 660 (as well as other steps of the method of FIG. 6). Within some of these alternative implementations, some components of the infrastructure of FIG. 1 can be modified or omitted altogether.

For example, within a first non-limiting alternative implementation of the method of FIG. 6 and, step 660 in particular, the following modifications are envisioned. Each of the client mappings 104a, 110a, 118a may comprise an indication of a user identifier stored in association with either each of the communication devices served by the respective network elements 104, 110, 118 or those communication devices served by the respective network elements 104, 110, 118 that subscribe to the ACSJ feature contemplated here. This user identifier can be similar to the user identifier stored within the user identifier 702 and can be used (either exclusively or non-exclusively) for the purposes of implementing the ACSJ feature according to this non-limiting embodiment of the present invention. Within these embodiments, as part of step 650, the application server 130 receives an indication of the user identifier associated with the communication device that has provided the indication of the desire to establish the communication session in step 610. Based on this indication of the user identifier, the application server 130 can query a plurality of network elements (such as, for example, the network elements 104, 110, 118) to determine if there exists an active communication session associated with other communication devices that are associated with the same user identifier. Within these embodiments of the present invention, the association between the communication devices that are associated with the same user identifier can be said to be a "device group" and the user identifier can be said to be a "device group identifier". As one skilled in the art will appreciate, within these embodiments of the present invention, the application server 130 is aware of a location at which each of the plurality of the network elements can be contacted. This knowledge can be obtained by the application server 130 in a number of different ways, for example, by a respective service provider associated with each of the plurality of network elements submitting such an indication of the location to the application server 130. Within these embodiments of the present invention, the functionality of the subscription mapping 700 can be said to be distributed among the client mappings 104a, 108a, 118a and, as such, there may be no need for the subscription mapping 700 per se.

Within a second non-limiting alternative implementation of step 660, the following modifications are envisioned. Each of the client mappings 104a, 110a, 118a may comprise an indication of a device group identifier stored in association with either each of the communication devices served by the respective network elements 104, 110, 118 or those communication devices served by the respective network elements 104, 110, 118 that subscribe to the ACSJ feature contemplated here. This device group identifier can be similar to the user identifier stored within the user identifier 702 and can be used (exclusively or non-exclusively) for the purposes of implementing the ACSJ feature according to this non-limiting embodiment of the present invention. Furthermore, the subscription mapping 700 may correlate a given user identifier 702 (which in these embodiments comprises an indication of the device group identifier) to a subscription profile 704 (which comprises an indication of network elements responsible for handling communication on behalf of communication devices associated with a given device group). Within these embodiments, the application server 130 may not be aware of the network addresses associated with the subscribing communication devices. Within these embodiments, the network element 130 receives an indication of the device group identifier associated with the communication device that has provided the indication of the desire to establish the communication session in step 610. Based on this indication of the device group identifier, the application server 130 can query the network elements (that are identified within the subscription profile 700) to determine if there exists an active communication session associated with other communication devices that are associated with the same device group identifier.

Naturally, a number of other alternative embodiments of step 660 (as well as other steps of the method of FIG. 6) are possible.

Step 670

If the application server 130 determines that none of the subscribing communication devices 102*a*, 102*b*, 106, 112, 114 (other than the communication device that has provided the indication of the desire to establish the communication session at step 610) associated with the identifier 520*a* associated with the user 101 is engaged in the active communication session (i.e. the "NO" branch of step 660), an exception handling process can be executed at step 670.

Scenario 1 For example, the application server 130 can transmit a response to the processing query received at step 650 to the network element 110. The response can indicate to the network element 110 to cause the communication device 112 to emit a dial tone, the dial tone for indicating to the user 101 to dial a telephone number to establish a new communication session.

Scenario 2 In this example, the application server 130 can transmit a response to the processing query received at step 650 to the network element 118. The response can indicate to the network element 118 to cause the communication device 114 to present the user 101 a message advising the user 101 that no active communication session exists and that the user 101 can establish a new communication session. This message can be an audio message, a textual message, a graphic-based message, a combination thereof, etc.

Step 680

If, on the other hand, the application server 130 determines that an active communication session is in progress with at least one subscribing communication device (i.e. the "YES" branch of step 660), the application server 130 executes step 680.

Based on the assumptions made above, the application server makes the following determinations:

Scenario 1 The application server 130 determines that the communication device 114 is currently engaged in an active communication session.

Scenario 2 The application server 130 determines that the communication device 102*a* is currently engaged in an active communication session.

At step 680, the application server 130 causes the communication device that has provided the indication of the desire to establish the communication session in step 610 to join the active communication session.

Scenario 1 Within this scenario, the application server 130 causes the communication device 112 to join the active communication session terminating on the communication device 114. For example, the application server 130 may transmit a trigger to one of the network elements 110, 118 to trigger one of the network elements 110, 118 to cause establishment of a three-way call between the communication device 114, another party of the active communication session (other than the communication device 114) and the communication device 112. As one example, the network element 118 may cause the three-way call to be established in substantially the same manner as if the communication device 114 triggered the three-way call with the communication device 112.

In an alternative non-limiting embodiment of the present invention, the network element 118 may cause the communication device 114 to establish a three-way call with the communication device 112 by transmitting an appropriate command to the communication device 114. In further non-limiting embodiments of the present invention, one of the application server 130 and the network element 118 can establish a call with the communication device 112. The application server 130 or the network element 112 may then bridge the so-established call with the communication device 112 with the active communication session. One skilled in the art will appreciate that a myriad of other alternative implementations for step 680 are possible.

The user 101 may now terminate the active communication session on the communication device 114 and continue with the active communication session on the communication device 112.

Scenario 2 Within this scenario, the application server 130 causes the communication device 114 to join the active communication session terminating on the communication device 102*a*. For example, the application server 130 may transmit a trigger to one of the network elements 104, 118 to trigger one of the network elements 104, 118 to cause establishment of a three-way call between the communication device 102*a*, another party of the active communication session (other than the communication device 102*a*) and the communication device 114. As one example, the network element 104 may cause the three-way call to be established in substantially the same manner as if the communication device 102*a* triggered the three-way call with the communication device 114.

One skilled in the art will appreciate that a number of alternative implementations for step 680 within this scenario are possible, including, but not limited to those, illustrated above with reference to Scenario 1.

The user 101 may now terminate the active communication session on the communication device 102*a* and continue with the active communication session on the communication device 114.

In some embodiments of the present invention, the application server 130 can loop back to executing the step 610, where the network element (such as one of the network elements 104, 110, 118) awaits another indication of the desire of one of the subscribing communication devices to establish a communication session is received.

Figure 8:
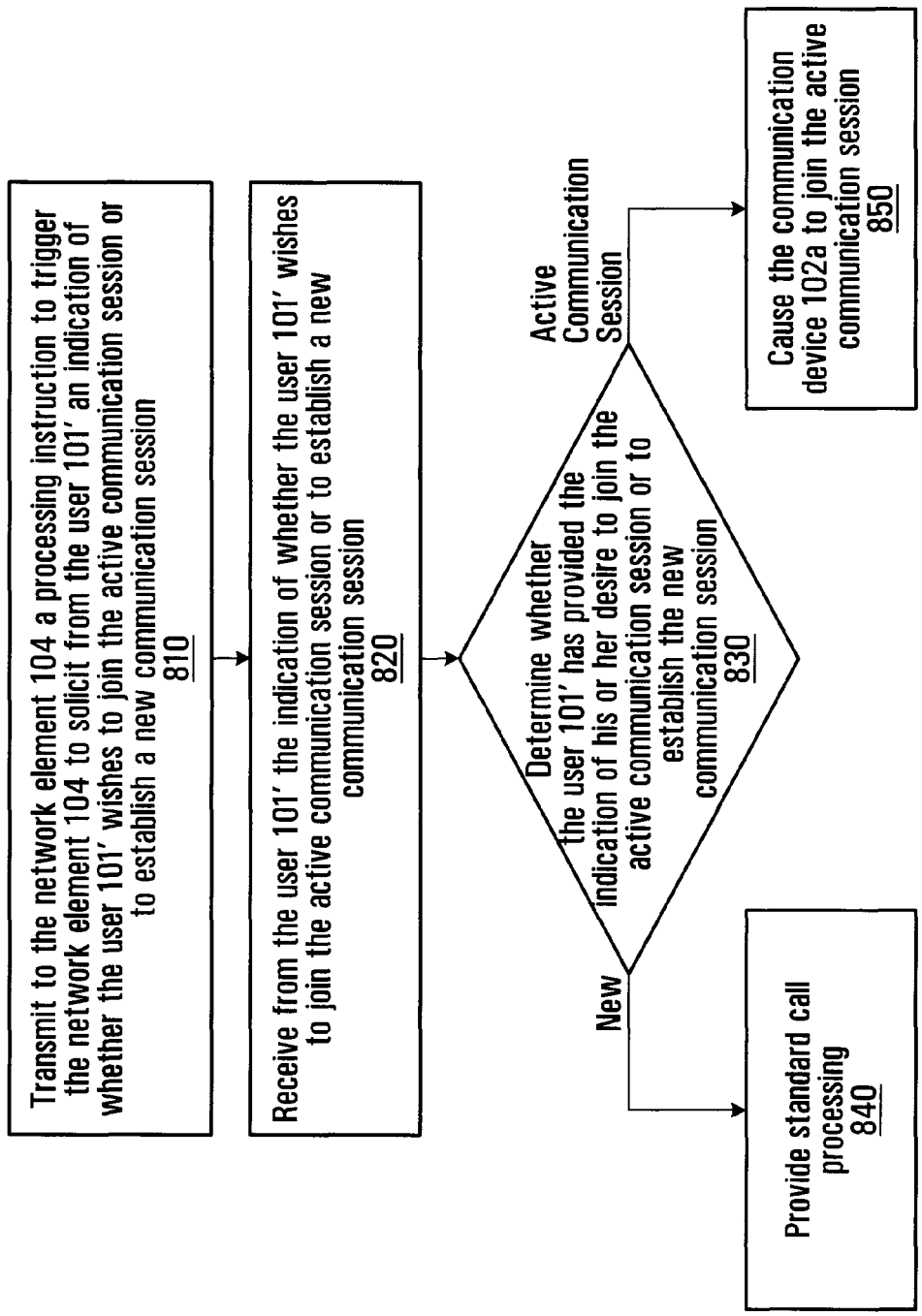
FIG. 8 is a flow chart representing another non-limiting embodiment of a method for causing a communication device to join an active communication session ("in-use") executed within the infrastructure of FIG. 1.

With reference to FIG. 8 a method for causing a communication device to join a communication session "in-use" according to a second non-limiting embodiment of the present invention will now be described. For the purposes of the description to be presented herein below, the following scenario will be used:

In this scenario it is assumed that the user 101 is driving towards the customer premises 102 (where the communication devices 102*a*, 102*b* are located) and is currently engaged in an active communication session using the communication device 114. The aforementioned user 101' within the customer premises 102 wishes to use the communication device 102*a* to establish a communication session. The user 101' may not be aware a priori of the active communication session maintained by the user 101 at the communication device 114 or may not be certain whether he or she wishes to join the active communication session (if such active communication session existed).

The method of FIG. 8 first executes steps substantially similar to the steps 610-670 of FIG. 6. The description of the method of FIG. 8 will, therefore, commence with a description of step 810 which is performed after a positive determination has been made in a step substantially similar to step 660 of FIG. 6 that an active communication session is in progress with at least one subscribing communication device. Within the example being presented herein, the application server determines that the communication device 114 is engaged in the active communication session.

Step 810

The application server 130 may then, as step 810, transmit a processing instruction to the network element 104. The processing instruction is to trigger the network element 104 to solicit an indication from the user 101' of the communication device 102a of whether the user 101' is desirous of either (a) joining the active communication session; or (b) establishing a new communication session. Several non-limiting scenarios how the user 101' of the communication device 102a may provide the indication of whether he or she wishes to join the active communication session or to establish the new communication session are envisioned.

In a first non-limiting scenario, the network element 104 may transmit a trigger to the communication device 102a to cause the communication device 102a to present the user 101' of the communication device 102a two options, such as, for example, two soft keys: "JOIN" and "NEW SESSION". In an alternative embodiment of the present invention, the communication device 102a may preset the user 101' of the communication device 102a two links representative of the two options.

In another non-limiting scenario, the network element 104 may generate a voice message soliciting from the user 101' of the communication device 102a the indication of whether the user 101' wishes to establish a new communication session or to join the active communication session. Within some of these embodiments, the network element 104a can provide additional information associated with the active communication session, such as, for example, CLID information associated with the other party of the active communication session. In yet another non-limiting embodiment of the present invention, the network element 104 may transmit a trigger to the communication device 102a, the trigger for causing the communication device 102a to generate a voice message soliciting from the user 101' the indication of whether he or she wishes to establish a new communication session or to join the active communication session.

Naturally, the labels to be associated with the two options are presented here as an example only. Any other set of suitable labels can be used, such as, but not limited to, "OPTION 1"/"OPTION 2", "EXISTING"/"NEW", "JOIN"/"CALL OUT", etc.

Step 820

Next, at step 820, the network element 104 receives from the communication device 102a the indication of whether the user 101' wishes to join the active communication session or to establish the new communication session (i.e. a disposition instruction). How the user 101' provides the indication of whether he or she wishes to join the active communication session or to establish the new communication session is not limited.

In a first non-limiting scenario, the user 101' may provide the indication of whether he or she wishes to join the active communication session or to establish the new communication session by selecting one of the soft keys presented by the communication device 102a (ex. the "JOIN"/"NEW SESSION" soft keys). In a second non-limiting scenario, the user 101' may provide the indication of whether he or she wishes to join the active communication session or to establish the new communication session by providing a speech utterance indicative of whether he or she wishes to join the active communication session or to establish the new communication session. In another non-limiting scenario, the user 101' may provide the indication that the user 101' wishes to join the active communication session by providing a first pre-determined sequence of digits. Within these non-limiting embodiments, the user 101' may provide the indication that the user 101' wishes to establish the new communication session by providing a second pre-determined sequence of digits. In another non-limiting scenario, the user 101' may provide the indication of whether he or she wishes to join the active communication session or to establish the new communication session by clicking on a hyper-link, an icon and the like. If no indication is received after a pre-determined period of time, the network element could, for example, default to a particular choice.

It is contemplated that the user 101' may even provide the indication of whether he or she wishes to join the active communication session or to establish the new communication session by means other than those presented by the communication device 102a. For example, the user 101' may employ another communication device, a computing apparatus and the like to provide the indication of whether he or she wishes to join the active communication session or to establish the new communication session. In these embodiments of the present invention, as part of providing the indication, the user 101' also indicates which communication device (ex. one of the communication device 102a, 102b) the user 101' wishes to use to join the active communication session or to establish the new communication session.

The network element 104 then transmits to the application server 130 the indication of whether the user 101' wishes to join the active communication session or to establish the new communication session.

Step 830

The application server 130 then examines the indication received as part of step 820 in order to determine whether the user 101' is desirous of joining an active communication session or of establishing the new communication session.

Step 840

If the application server 130 determines that the user 101' wishes to establish the new communication session (i.e. the "NEW" branch of step 830), the application server 130 can cause the network element 140 to provide standard call processing at step 840. For example, the network element 104 may cause the communication device 102a to emit a dial tone.

Step 850

If, on the other hand, the application server 130 determines that the user 101' wishes to join the active communication session (i.e. the "Active Communication Session" branch of step 830), the application server 130 causes the communication device 102a to join the active communication session at step 850. Step 850 can be implemented in substantially the same manner as step 680 of the method of FIG. 6.

Figure 9:
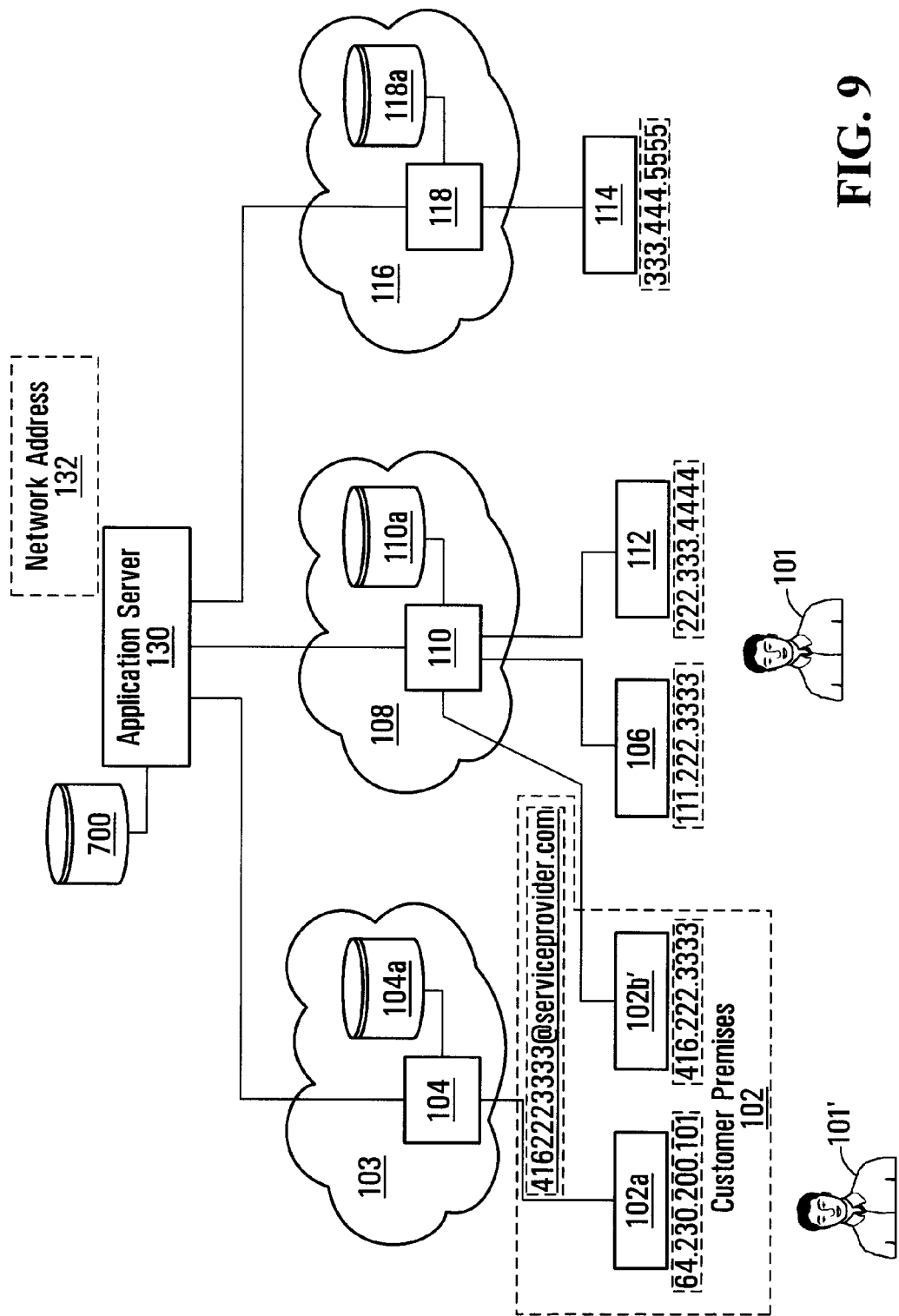
FIG. 9 is a diagram representing various components of another non-limiting embodiment of an infrastructure for causing a communication device to join a communication session.

FIG. 9 depicts another non-limiting embodiment of an infrastructure for causing a communication device to join a communication session, which is substantially similar to the infrastructure of FIG. 1 and, as such, like elements are depicted by like numerals. A communication device 102b' of the infrastructure of FIG. 9 is located at the customer premises 102 and is coupled to the communication network 108. The communication device 102b' can be assigned with a telephone number "416.222.3333". It should be noted that in the specific non-limiting embodiment depicted in FIG. 9 the telephone number assigned to the communication device 102b' can be the same as a portion of the SIP URI assigned to the communication device 102a, but this need not be so in every embodiment of the present invention. As such, the communication device 102a and the communication device 102b' can be addressed by the same telephone number even though they are coupled to different communication networks (i.e. the communication network 103 and the communication network 108). Naturally, a record maintained by the network element 104a associated with the communication device 102a and a record maintained by the network element 110 associated with the communication device 102b' need to be provisioned with an appropriate trigger to ensure that an indication of a call received by one of the network elements 104, 110 is provided to the other one of the network elements 104, 110. However, this need not be so in every embodiment of the present invention. For example, in an alternative non-limiting embodiment of FIG. 9, the telephone number assigned to the communication device 102b' can be independent from the SIP URI assigned to the communication device 102a.

In an alternative non-limiting implementation of FIG. 9, all of the communication devices 102a, 102b', 106, 112 may be located at the customer premises 102 and may be coupled to two or more different communication networks.

Within the infrastructure of FIG. 9, the user 101 (or the user 101') could execute the above-described methods, for example, to cause the communication device 102b' to join a communication session terminated on the communication device 102a and vice versa. Within these embodiments of the present invention, the customer premises 102 can be referred to as a "hybrid premises", as it comprises communication devices coupled to more than one communication network (i.e. communication networks 103, 108).

Figure 10:
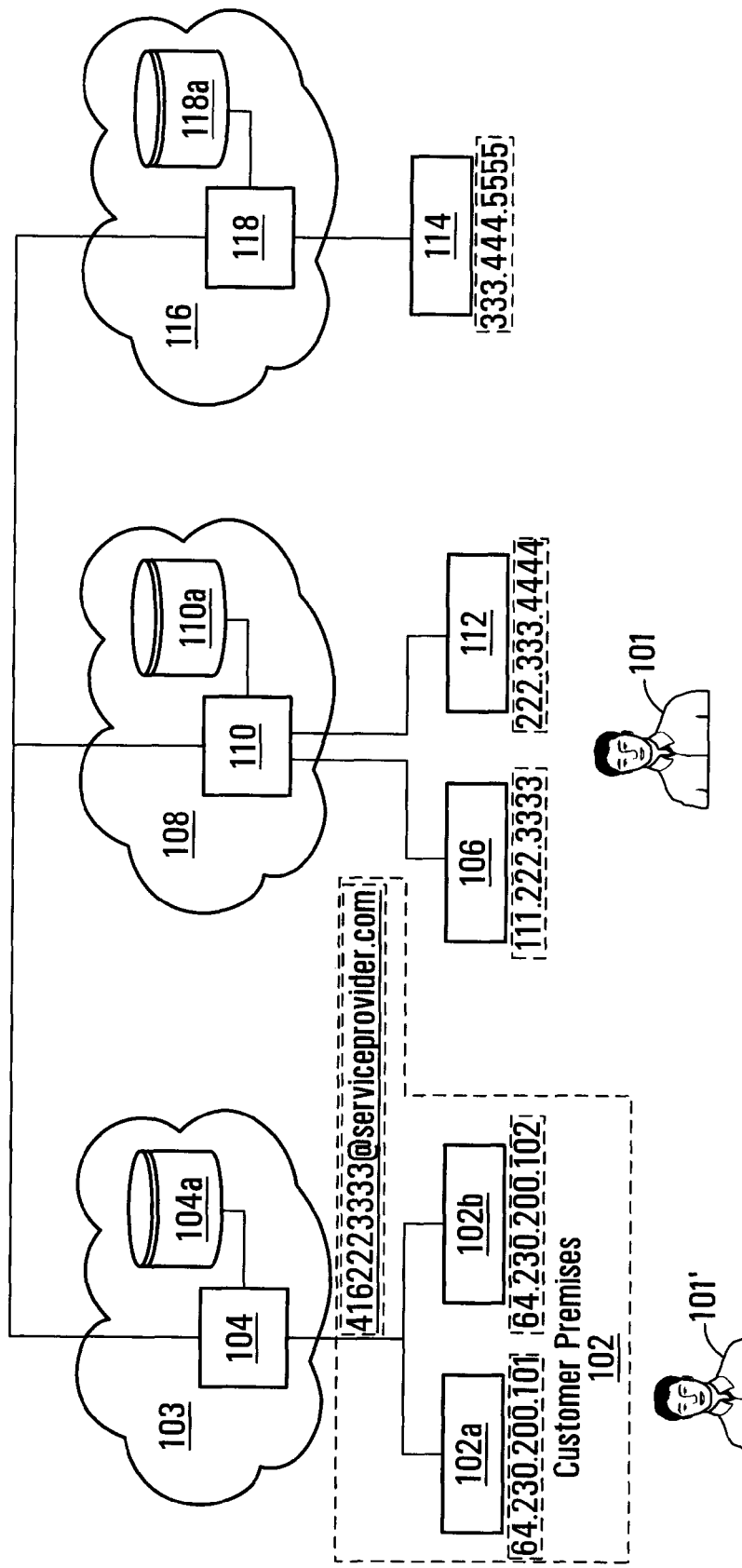
FIG. 10 is a diagram representing various components of yet another non-limiting embodiment of an infrastructure for causing a communication device to join a communication session.

FIG. 10 depicts another non-limiting embodiment of an infrastructure for causing a communication device to join a communication session, which is substantially similar to the infrastructure of FIG. 1 and, as such, like elements are depicted by like numerals. Within the infrastructure of FIG. 10, the functionality performed by the application server 130 of FIG. 1 is distributed among the network elements 104, 110, 118 and, as such, the application server 130 of FIG. 1 is omitted from the infrastructure of FIG. 10.

Within these embodiments, each of the client mappings 104a, 110a, 118a may comprise an indication of a user identifier (or a device group identifier) stored in association with either each of the communication devices served by the respective network elements 104, 110, 118 or those communication devices served by the respective network elements 104, 110, 118 that subscribe to the ACSJ feature contemplated here. This user identifier can be similar to the user identifier stored within the user identifier 702 and can be used for the purposes of implementing the ACSJ feature according to this non-limiting embodiment of the present invention. When an indication of a desire to establish a communication session is received from a given communication device by a given one of the network elements 104, 110, 118, the given one of the network elements 104, 110, 118 queries the other ones of the network elements 104, 110, 118, based on the user identifier, to identify whether any other communication devices associated with the same user identifier and served by the respective network elements 104, 110, 118 are engaged in an active communication session. The given one of the network elements 104, 110, 118 can execute a method for causing a communication device to join a communication session substantially similar to the method described above.

A First Optional Enhancement

A first optional enhancement according to a non-limiting embodiment of the present invention will now be described. It should be understood that the first optional enhancement can be performed as part of the method in-use of FIG. 6 or as part of the method in-use of FIG. 8.

In these non-limiting embodiments of the present invention, it is envisioned that the application server 130 may determine that more than one active communication session exist. The following non-limiting scenario is envisioned:

In this scenario it is assumed that the user 101 is driving towards the cottage where the communication device 112 is located and is currently engaged in an active communication session using the communication device 114 (herein below referred to as a "first active communication session"). Once the user 101 arrives at the cottage, the user 101 is desirous of using the communication device 112 to join the active communication session. At the same time, the aforementioned user 101' within the customer premises 102 is engaged in a second active communication session using the communication device 102a.

The application server 130 may cause the network element 110 to inform the user 101 that two active communication sessions exist. For example, the network element 110 can present an audio message announcing to the user 101 that two active communication sessions exist. In alternative non-limiting embodiments of the present invention, the announcement may take the form of a textual message or a combined audio-textual message. In yet further non-limiting embodiments of the present invention, the audio, text or combination message may be presented to the user 101 via another suitable means (such as, for example, via an instant messaging application, a pop-up window in a computing apparatus and the like).

In a non-limiting embodiment of the present invention, the network element 110 may identify the first active communication session and the second active communication session by a respective network identifier associated with the communication devices 114, 102a. In alternative non-limiting embodiments of the present invention, the application server 130 may maintain an indication of an auxiliary identifier of each of the subscribing communication devices 102a, 102b, 106, 112, 114, the auxiliary identifier being more amenable to being remembered and understood by the user 101 than the network identifiers. Some examples of the auxiliary identifiers include, but are not limited to, "Home"/"Cottage"/"Office", "Phone No. 1"/"Phone No. 2"/"Phone No. 3". Naturally, other types of the auxiliary identifiers are possible. The indication of the auxiliary identifier may be stored in the aforementioned subscription mapping 700. In these non-limiting embodiments of the present invention, the application server 130 may cause the network element 110 to identify the first and second active communication sessions by presenting to the user 101 the respective auxiliary identifier of the corresponding communication devices 114, 102a. In an alternative non-limiting embodiment of the present invention, the first and second active communication sessions may be identified by CLID information (such as a number, a name or a combination thereof) of another party to the first and second active communication sessions.

The network element 110 may further solicit an indication from the user 101 of which one of the first and second active communication sessions the user 101 is desirous of joining. Next, the application server 130 receives from the network element 110 the indication of which of the first and second active communication sessions the user 101 is desirous of joining. In some non-limiting embodiments of the present invention, the user 101 may provide the indication of which of the first and second active communication sessions the user 101 is desirous of joining by, for example, producing a spoken utterance indicative of which of the first and second active communication sessions the user 101 is desirous of joining, by keying in a pre-determined sequence of keys indicative of which of the first and second active communication sessions the user 101 is desirous of joining, by clicking a pre-determined key, link or button indicative of which of the first and second active communication sessions the user 101 is desirous of joining. Naturally, the indication of which of the first and second active communication sessions the user 101 is desirous of joining may be provided by other means which will become apparent to those of skill in the art.

A Second Optional Enhancement

In an alternative non-limiting embodiment of the present invention, before executing step 680 of the method of FIG. 6 or step 850 of the method of FIG. 8, the application server 130 may first cause announcement via the active communication session to a user of the communication device who is engaged in the active communication session that another communication device user wishes to join the active communication session.

This second optional enhancement can be particularly applicable in the following scenario:

The user 101 has subscribing communication devices 102a, 102b, 106, 112, 114 with the application server 130 for the purposes of the active communication session joining feature contemplated herein. The user 101 is driving and is involved in an active communication session using the communication device 114. The aforementioned user 101' at the customer premises 102 is about to start a communication session using the communication device 102a. By executing the method of FIG. 6, the application server 130 has determined that the active communication session is in progress with the communication device 114.

Assuming that this second optional enhancement is executed before step 630 of FIG. 6, in a first non-limiting example, the network element 118 may present an audible signal to the communication device 114, such as, for example, a distinctive beep or a message. The message can take the form of, for example, a synthesized audible message: "Another caller is trying to join your communication session". In a second non-limiting example, the network element 118 may present a visual signal to the communication device 114 to be displayed on a display. This visual signal may take a myriad of forms and its main function is to advise the user of the communication device 114 that user 101' is trying to join the active communication session. Naturally, a combination of the audio and the visual notification can be presented.

In these non-limiting embodiments of the present invention, the network element 118 may further solicit from the user 101 of the communication device 114 an indication of permission for the communication device 102a to join the active communication session. The indication of allowance may take a number of forms, such as for example, a spoken utterance "yes" or "no", a pre-determined sequence of keys indicative of "yes" or no clicking of a pre-determined key, button or link. Naturally, the indication of allowance may be provided by any other suitable means.

In an alternative non-limiting embodiment of the present invention, the network element 118 may announce to the user 101 that the user 101' at the communication device 102a is trying to join the active communication session and to solicit from the user 101 an indication of allowance for the communication device 102a to join the active communication session by means other than via the active communication session. For example, the network element 118 may transmit an instant message to an instant message application executed on the communication device 114 or another device; send a short text message to the communication device 114, send an e-mail message and the like. In an alternative non-limiting embodiment of the present invention, an indication of allowance can be solicited from all parties involved in the active communication session.

By executing this second optional enhancement, the user 101 may prevent unwanted and/or unintentional "barging into" the active communication maintained by the user 101 on one of the subscribing communication devices.

In some embodiments of the present invention, this second optional enhancement can be implemented together with the above-described first optional enhancement. Within these embodiments of the present invention, the network element 112 can solicit the indication of permission to join the active communication session before the active communication session join option is offered to the user 101' or after the user 101' has indicated the desire to join the active communication session.

Even though the foregoing description has been provided with an example of the active communication session comprising a voice communication session, one skilled in the art will readily appreciate that the type of the active communication session is not particularly limited and may include, but is not limited to, a video communication session, a text messaging communication session, an instant messaging communication session and the like. It should be further understood that teachings of this invention are not limited to the VoIP protocol and one skilled in the art can easily adapt the teachings presented herein to other protocols for handling voice-over-a-network communications.

It should be further understood that even though the foregoing discussion has focused on a plurality of subscribing communication devices being associated with a user, the teachings provided herein can be equally applied to a plurality of subscribing communication devices associated with an entity other than a single user. This entity may comprise an organization, a physical premises (such as, for example, a household, an office, etc.), a plurality of users, etc.

Those skilled in the art will appreciate that certain functionality of the application server 130 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the application server 130 and/or other elements may be implemented as an arithmetic and logic unit (ALU) having access to a code memory (not shown) which stores program instructions for the operation of the ALU. The program instructions could be stored on a medium which is fixed, tangible and readable directly by the application server 130 and/or other elements, (e.g., removable diskette, CD-ROM, ROM, fixed disk, USB drive), or the program instructions could be stored remotely but transmittable to the application server 130 and/or other elements via a modem or other interface device.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method for execution by a network element comprising:
   receiving from a first communication device an indication of a desire of said first communication device to establish a communication session;
   identifying a device group associated with said first communication device, said device group comprising said first communication device and at least one second communication device;
   responsive to said receiving and said identifying, determining if there exists an active communication session involving at least one of said at least one second communication device; and
   responsive to determining that there does exist an active communication session involving at least one of said at least one second communication device, causing said first communication device to join said active communication session.

2. The method defined in claim 1, wherein said receiving comprises receiving a processing request from an other network element responsible for handling communication sessions on behalf of said first communication device.

3. The method defined in claim 1, wherein said receiving comprises receiving a signalling message from said first communication device.

4. The method defined in claim 1, wherein said active communication session is a specific active communication session, and wherein said determining comprises:
   accessing a database mapping a network identifier of at least one subscribing communication device to an indication of the at least one subscribing communication device being engaged in an active communication session thereby to determine if any one of said at least one second communication device is engaged in said specific active communication session.

5. The method defined in claim 1, wherein said determining comprises:
   transmitting a query to an other network element responsible for handling communication sessions on behalf of said at least one second communication device;
   receiving a response therefrom, the response being indicative of whether there exists an active communication session involving at least one of said at least one second communication device.

6. The method defined in claim 1, said device group being associated with a device group identifier, wherein said determining comprises:
   transmitting a query to a plurality of network elements, the query comprising said device group identifier;
   receiving a response from at least a subset of said plurality of network elements, the response being indicative of whether there exists an active communication session involving at least one of said at least one second communication device.

7. The method defined in claim 1, wherein said causing said first communication device to join said active communication session comprises transmitting a command to an other network element responsible for handling communication sessions on behalf of said at least one second communication device, the command being operable to trigger said network element to cause said first communication device to join said active communication session.

8. The method defined in claim 7, said active communication session having been established between said at least one second communication device and an other communication party, wherein said command is operable to cause said other network element to establish a three-way call between said at least one second communication device, said first communication device and said other communication party.

9. The method defined in claim 1, said active communication session having been established between said at least one second communication device and another communication party, wherein said causing said first communication device to join said active communication session comprises transmitting a command to said at least one second communication device, the command being operable to trigger said at least one second communication device to establish a three-way call between said at least one second communication device, said first communication device and said other communication party.

10. The method defined in claim 1, wherein said causing said first communication device to join said active communication session comprises triggering an other network element responsible for handling communication sessions on behalf of said at least one second communication device to:
    establish said communication session with said first communication device; and
    bridge said communication session and said active communication session.

11. The method defined in claim 1, wherein said causing said first communication device to join said active communication session comprises:
    establishing said communication session with said first communication device; and
    bridging said communication session and said active communication session.

12. The method defined in claim 1, further comprising providing an alert to said at least one second communication device via said active communication session.

13. The method defined in claim 12, wherein said alert comprises at least one of a visual alert, an audio alert and a tactile alert.

14. The method defined in claim 12, further comprising soliciting from a participant of said active communication session via said active communication session an indication of permission for said first communication device to join said active communication session.

15. The method defined in claim 14, wherein said causing is executed only in response to receiving said indication of permission.

16. The method defined in claim 1, said at least one second communication device comprising a second communication device and a third communication device, wherein said determining comprises establishing that a first active communication session is in progress with said second communication device; and wherein said determining further comprises establishing that a second active communication session is in progress with said third communication device; and wherein the method further comprises:
    soliciting from said first communication device an indication of which one of said first and second active communication sessions said first communication device is desirous of joining.

17. The method defined in claim 16, further comprising receiving from said first communication device said indication of which one of said first and second active communication sessions said first communication device is desirous of joining; and wherein said causing comprises:
    causing said first communication device to join one of said first and second active communication sessions in accordance with said indication of which one of said first and second active communication sessions said first communication device is desirous of joining.

18. The method defined in claim 1, further comprising, responsive to determining that there does exist an active communication session and prior to said causing:
- soliciting from said first communication device a disposition instruction, said disposition instruction indicative of how to handle said communication session.

19. The method defined in claim 18, wherein said disposition instruction is indicative of one of:
- a first instruction to handle said communication session by causing said first communication device to join said active communication session; and
- a second instruction to handle said communication session by causing said first communication device to establish a new communication session.

20. The method defined in claim 19, wherein said causing is executed only in response to receipt of said disposition instruction indicative of said first instruction.

21. An apparatus comprising:
- means for receiving from a first communication device an indication of a desire of said first communication device to establish a communication session; said first communication device being associated with a device group comprising said first communication device and at least one second communication device;
- means for determining if there exists an active communication session involving at least one of said at least one second communication device; and
- means causing said first communication device to join said active communication session, said means for causing being responsive to determining that there does exist an active communication session involving at least one of said at least one second communication device.

22. A system comprising an application server operable:
- to receive from a first communication device an indication of a desire of said first communication device to establish a communication session; said first communication device being associated with a device group comprising said first communication device and at least one second communication device;
- to determine if there exists an active communication session involving at least one of said at least one second communication device; and
- responsive to determining that there does exist an active communication session involving at least one of said at least one second communication device, to cause said first communication device to join said active communication session.

23. The system defined in claim 22, further comprising a network element responsible for handling communication sessions on behalf of said first communication device; wherein said network element and said application server are communicatively coupled.

24. The system defined in claim 22, further comprising a network element responsible for handling communication sessions on behalf of said first communication device; wherein said network element and said application server are implemented in a single computing apparatus.

25. The system defined in claim 22, wherein to receive said indication from said first communication device, the application server is operable to receive a processing request from a network element responsible for handling communication sessions on behalf of said first communication device.

26. The system defined in claim 25, further comprising said network element; and wherein said network element is operable:
- to determine an off-hook condition at said first communication device;
- to determine if said first communication device is a subscriber to a communication session joining feature; and
- responsive to said first communication device being a subscriber, to transmit said indication to said application server.

27. The system defined in claim 25, further comprising said network element; and wherein said network element is operable:
- to determine an off-hook condition at said first communication device; and
- based on said off-hook condition, to transmit said indication to said application server.

28. The system defined in claim 25, further comprising said network element; and wherein said network element is operable:
- to receive a communication request from said first communication device;
- to determine if said first communication device is a subscriber to a communication session joining feature; and
- responsive to said first communication device being a subscriber, to transmit said indication to said application server.

29. The system defined in claim 25, further comprising said network element; and
wherein said network element is operable:
- to receive a communication request from said first communication device; and
- responsive to said communication request, to transmit said indication to said application server.

30. The system defined in claim 22, wherein said active communication session is a specific active communication session, and wherein to determine if there exists an active communication session with said at least one second communication device, the application server is operable:
- to access a database mapping a network identifier of at least one subscribing communication device to an indication of the at least one subscribing communication device being engaged in an active communication session thereby to determine if any one of said at least one second communication device is engaged in said specific active communication session.

31. The system defined in claim 22, wherein to determine if there exists an active communication session with said at least one second communication device, the application server is operable:
- to transmit a query to a network element responsible for handling communication sessions on behalf of said at least one second communication device; and
- to receive a response therefrom.

32. The system defined in claim 31, further comprising said network element, wherein said network element is operable to determine if there exists said active communication session with said at least one second communication device.

33. The system defined in claim 22, said device group being associated with a device group identifier, wherein to determine if there exists an active communication session with said at least one second communication device, the application server is operable:
- to transmit a query to a plurality of network elements, the query comprising said device group identifier; and
- to receive a response from at least a subset of said plurality of network elements.

34. The system defined in claim 22, wherein to cause said first communication device to join said active communication session, the application server is operable to transmit a command to a network element responsible for handling communication sessions on behalf of said at least one second communication device, the command being operable to trigger said network element to cause said first communication device to join said active communication session.

35. The system defined in claim 34, said active communication session having been established between said at least one second communication device and another communication party, wherein said command is operable to cause said network element to establish a three-way call between said first communication device, said at least one second communication device and said other communication party.

36. The system defined in claim 22, said active communication session having been established between said at least one second communication device and another communication party, wherein to cause said first communication device to join said active communication session, the application server is operable to transmit a command to said at least one second communication device, the command being operable to trigger said at least one second communication device to establish a three-way call between said at least one second communication device, said first communication device and said other communication party.

37. The system defined in claim 22, wherein to cause said first communication device to join said active communication session, the application server is operable:
to establish said communication session with said first communication device; and
to bridge said communication session and said active communication session.

38. The system defined in claim 22, further comprising a network element responsible for handling communication sessions on behalf of said at least one second communication device, wherein to cause said first communication device to join said active communication session, the application server is operable to trigger said network element to:
establish said communication session with said first communication device; and
bridge said communication session and said active communication session.

39. The system defined in claim 22, wherein the application server is operable to cause provision of an alert to said at least one second communication device via said active communication session.

40. The system defined in claim 39, wherein said alert comprises at least one of a visual alert, an audio alert and a tactile alert.

41. The system defined in claim 39, wherein the application server is further operable to cause solicitation from a participant of said active communication session via said active communication session an indication of permission for said first communication device to join said active communication session.

42. The system defined in claim 41, wherein a receipt of said indication of permission triggers the application server to cause said first communication device to join said active communication session.

43. The system defined in claim 22, said at least one second communication device comprising a second communication device and a third communication device, wherein the system further comprises said first communication device, said at least one second communication device and said third communication device; and wherein if the application server determines that a first active communication session is in progress with said at least one second communication device and that a second active communication session is in progress with said third communication device, the application server is operable to:
solicit from said first communication device an indication of which one of said first and second active communication sessions said first communication device is desirous of joining.

44. The system defined in claim 43, wherein the application server is further operable to receive from said first communication device said indication of which one of said first and second active communication sessions said first communication device is desirous of joining; and wherein to cause said first communication device to join said active communication session, the application server is operable to:
cause said first communication device to join one of said first and second active communication sessions in accordance with said indication of which one of said first and second active communication sessions said first communication device is desirous of joining.

45. The system defined in claim 22, further comprising a communication network intermediate between said application server and said first and said at least one second communication devices.

46. The system defined in claim 22, further comprising a first communication network intermediate between said application server and said first communication device and a second communication network intermediate between said application server and said at least one second communication device.

47. The system defined in claim 22, wherein the application server is further operable, responsive to a determination that there does exist an active communication session and prior to causing said first communication device to join said active communication session:
to solicit from said first communication device a disposition instruction, said disposition instruction indicative of how to handle said communication session.

48. The system defined in claim 47, wherein said disposition instruction is indicative of one of:
a first instruction to handle said communication session by causing said first communication device to join said active communication session;
a second instruction to handle said communication session by causing said first communication device to establish a new communication session.

49. The system defined in claim 48, wherein the application server is operable to cause said first communication device to join said active communication session only in response to receipt of said disposition instruction indicative of said first instruction.

50. A non-transitory computer-readable storage medium comprising computer-readable program code which, when executed by a computing apparatus, causes the computing apparatus:
to receive from a first communication device an indication of a desire of said first communication device to establish a communication session; said first communication device being associated with a device group comprising said first communication device and at least one second communication device;
to determine if there exists an active communication session involving at least one of said at least one second communication device; and
responsive to determining that there does exist an active communication session involving at least one of said at least one second communication device, to cause said first communication device to join said active communication session.

* * * * *